(12) United States Patent
Kocsis et al.

(10) Patent No.: US 11,063,759 B2
(45) Date of Patent: Jul. 13, 2021

(54) BLOCKCHAIN-EMPOWERED CROWDSOURCED COMPUTING SYSTEM

(71) Applicants: Jin Kocsis, Aurora, OH (US); Yifu Wu, Akron, OH (US); Gihan Janith Mendis Imbulgoda Liyangahawatte, Akron, OH (US)

(72) Inventors: Jin Kocsis, Aurora, OH (US); Yifu Wu, Akron, OH (US); Gihan Janith Mendis Imbulgoda Liyangahawatte, Akron, OH (US)

(73) Assignee: The University of Akron, Akron, OH (US)

( * ) Notice: Subject to any disclaimer, the term of this patent is extended or adjusted under 35 U.S.C. 154(b) by 134 days.

(21) Appl. No.: 16/397,513

(22) Filed: Apr. 29, 2019

(65) Prior Publication Data

US 2019/0334716 A1    Oct. 31, 2019

Related U.S. Application Data

(60) Provisional application No. 62/663,287, filed on Apr. 27, 2018.

(51) Int. Cl.
| | | |
|---|---|---|
| *H04L 9/32* | (2006.01) | |
| *H04L 9/00* | (2006.01) | |
| *G06N 20/00* | (2019.01) | |
| *H04L 29/06* | (2006.01) | |

(52) U.S. Cl.
CPC ............ *H04L 9/321* (2013.01); *G06N 20/00* (2019.01); *H04L 9/008* (2013.01); *H04L 63/0442* (2013.01); *H04L 2209/38* (2013.01)

(58) Field of Classification Search
CPC ..... H04L 9/321; H04L 9/008; H04L 63/0442; H04L 2209/38; H04L 9/3239; G06N 20/00; G06N 3/0481; G06N 3/0454; G06N 3/084
USPC .......................................................... 713/164
See application file for complete search history.

(56) References Cited

U.S. PATENT DOCUMENTS

| | | | |
|---|---|---|---|
| 9,934,138 B1* | 4/2018 | Bache ................. | G06F 11/3688 |
| 2017/0279818 A1* | 9/2017 | Milazzo ................ | H04L 63/145 |
| 2017/0346833 A1* | 11/2017 | Zhang .................. | H04L 9/3218 |
| 2018/0089374 A1* | 3/2018 | Gibson ................. | G16H 30/20 |
| 2018/0165611 A1* | 6/2018 | Saxena ................. | G06N 20/00 |
| 2018/0167393 A1* | 6/2018 | Walrant ............. | H04L 63/0876 |

(Continued)

*Primary Examiner* — Kambiz Zand
*Assistant Examiner* — Aubrey H Wyszynski
(74) *Attorney, Agent, or Firm* — Renner Kenner Grieve Bobak Taylor & Weber

(57) ABSTRACT

In various embodiments, the present invention is directed to a decentralized and secure method for developing machine learning models using homomorphic encryption and blockchain smart contracts technology to realize a secure, decentralized system and privacy-preserving computing system incentivizes the sharing of private data or at least the sharing of resultant machine learning models from the analysis of private data. In various embodiments, the method uses a homomorphic encryption (HE)-based encryption interface designed to ensure the security and the privacy-preservation of the shared learning models, while minimizing the computation overhead for performing calculation on the encrypted domain and, at the same time, ensuring the accuracy of the quantitative verifications obtained by the verification contributors in the cipherspace.

11 Claims, 11 Drawing Sheets

(56) References Cited

U.S. PATENT DOCUMENTS

| | | | |
|---|---|---|---|
| 2018/0276055 A1* | 9/2018 | Furuichi | G06F 9/542 |
| 2018/0294955 A1* | 10/2018 | Rhie | G06F 16/2272 |
| 2018/0349207 A1* | 12/2018 | Erickson | G06F 40/263 |
| 2019/0102736 A1* | 4/2019 | Hudson | G06Q 10/0875 |
| 2019/0180047 A1* | 6/2019 | Matetic | G06Q 20/065 |
| 2019/0207762 A1* | 7/2019 | Xie | H04L 9/3247 |

* cited by examiner

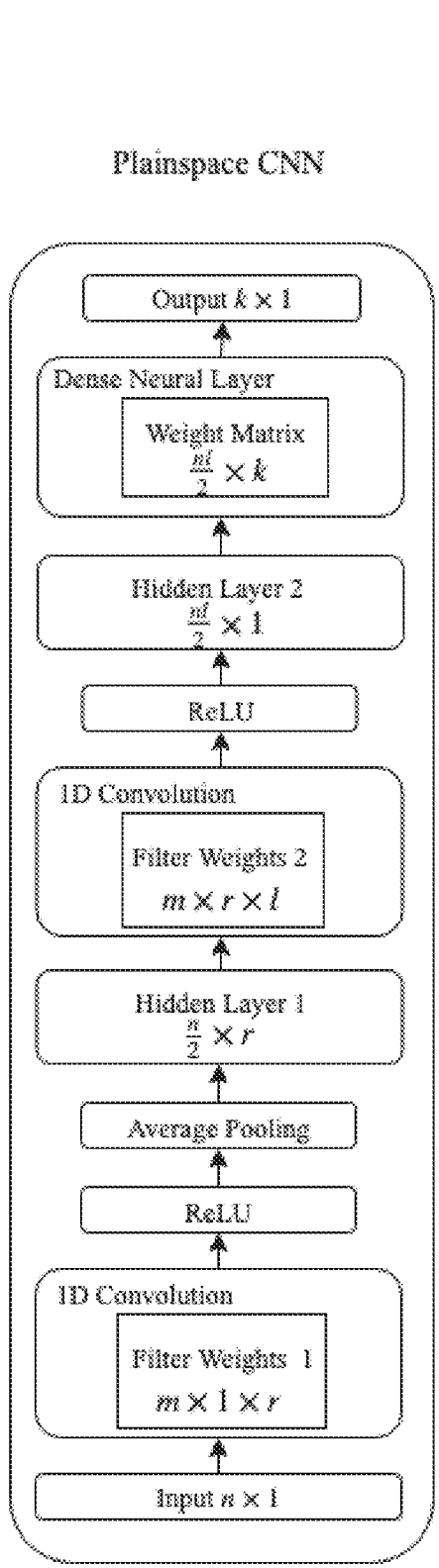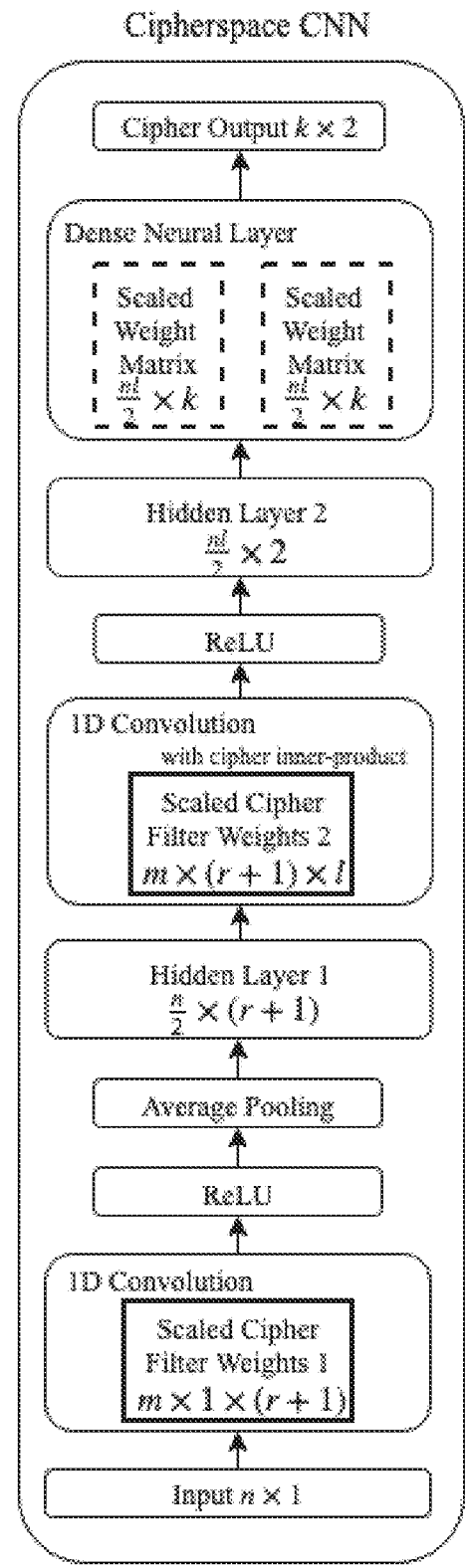
Fig. 10A
Fig. 10B

BLOCKCHAIN-EMPOWERED CROWDSOURCED COMPUTING SYSTEM

CROSS REFERENCE TO RELATED APPLICATIONS

This application claims the benefit of U.S. provisional patent application Ser. No. 62/663,287 entitled Blockchain-Empowered Decentralized Deep Learning Infrastructure filed Apr. 27, 2018, and incorporated herein by reference in its entirety.

STATEMENT REGARDING FEDERALLY SPONSORED RESEARCH OR DEVELOPMENT SUPPORT

This invention was made with government support under 80NSSC17K0530 awarded by the National Aeronautics and Space Administration (NASA). The government has certain rights in the invention.

FIELD OF THE INVENTION

One or more embodiments of the present invention relates to an improved system for machine learning. In certain embodiments, the present invention is directed to a decentralized and secure computing system for developing machine learning models.

BACKGROUND OF THE INVENTION

Big data analytics has become a valuable tool for various applications. However it is challenging to implement big data analytics because of the need to acquire a large amount of data and to have sufficient computing power to handle the data. In many instances these challenges are addressed by relying on a dominant cloud computing vendor, but, although commercial cloud vendors provide valuable platforms for big data analytics, they can suffer from a lack of transparency, security, and privacy. Furthermore, reliance on cloud servers prevents applying big data analytics in environments where the computing power is scattered.

SUMMARY OF THE INVENTION

In one or more embodiments, the present invention is directed to a decentralized and secure computing system is provided for developing machine learning models. The system employs blockchain smart contracts executed on a networked blockchain platform having the ability to execute scripts (i.e., programming language that supports programs written for a run-time environment that automates the execution of tasks) and to provide a user interface at some or all of the nodes in the network. Blockchain smart contract technology is employed to realize a secure, decentralized, and privacy-preserving computing system that incentivizes the sharing of computing power and computing intelligence from the public. It also incentivizes the sharing of private data or at least the sharing of resultant machine learning models from the analysis of private data. This system employs blockchain smart contract, decentralized learning, and software defined networking techniques, and can be widely implemented in different application fields, such as cognitive communications in deep space/near space exploration; next-generation vendor-independent data sharing and analysis; mobile cloud-sensing; and critical infrastructure monitoring and control.

One or more embodiments of the present invention provides a method for developing machine learning models through a decentralized and secure computing system, the method comprising the steps of: establishing a peer to peer (P2P) network running on a blockchain platform and including a plurality of nodes capable of acting as any one of an application initiator node, a computing contributor node, and a verification contributor node; wherein the application initiator node: defines a task for generating a machine learning model, the task being defined through a blockchain smart contract, and broadcasts the task to P2P network via the blockchain smart contract such that the plurality of nodes receive the task and assist in the task as either computing contributor nodes or verification contributor nodes; wherein each computing contributor node: employs contributor-available data to generate a private model for achieving the task, encrypts the private model, and provides the encrypted private model for access by verification contributor nodes; wherein each verification contributor node: accesses the encrypted private model, tests the private model to determine if it achieves the task, and informs the application initiator node if a private model satisfies the task. In one or more embodiments, the method further comprises decentralized storage for access by application initiator nodes, computing contributor nodes, and verification contributor nodes.

In some of these embodiments, the application initiator node provides data or an initial machine learning model or both data and an initial machine learning model to decentralized storage for access by computing contributor nodes or verification contributor nodes or both computing contributor nodes and verification contributor nodes.

In one or more of these embodiments, the private model is encrypted using homomorphic encryption. In some of these embodiments, the private model is encrypted using substantially homomorphic encryption. In one or more of these embodiments, a public key and a secret key are generated by the application initiator or the blockchain smart contract and/or blockchain platform as directed by the application initiator, wherein said public key permits encryption of testing documents in the same manner as the private model so that the private model may be tested in cipherspace. In some of these embodiments, the secret key may be used to decrypt the private model.

In one or more embodiments, the present invention is directed to a method for developing machine learning models through a decentralized and secure computing system, the method comprising the steps of: establishing a peer to peer (P2P) network running on a blockchain platform and including a plurality of nodes capable of acting as any one of an application initiator node, a computing contributor node, and a verification contributor node and decentralized storage accessible by said plurality of nodes; wherein one of said plurality of nodes elects to act as an application initiator node, prepares a blockchain smart contract on said blockchain platform, said blockchain smart contract defining a task for generating a machine learning model, the criteria for selecting one or more nodes of said a plurality of nodes to act as verification contributor nodes, the criteria for verifying completion of the task, and the criteria for triggering a transfer event, said task being broadcasts the to the P2P network via the blockchain smart contract such that the plurality of nodes receive the task; wherein said application initiator node generates a public key available to all of the nodes on said P2P network and a secret key available only to said application initiator node; wherein each node receiving the tasks elects whether to assist with the task by acting as a computing contributor node, with the proviso that at least one of said plurality of nodes elects to act as a computing contributor node; wherein each of said plurality of nodes acting as a computing contributor node employs contributor-available data to generate a private model for achieving the task, and stores the encrypted private model on the decentralized storage; wherein one or more of said plurality of nodes is selected to act as a verification contributor node according to the terms of the smart contract; wherein each verification contributor node accesses the encrypted private model, tests the private model according to the criteria set forth in the smart contract to determine if it achieves the task, and informs the blockchain smart contract on said blockchain platform if the private model satisfies the task; and wherein said blockchain smart contract on said blockchain platform determines whether the criteria for triggering a transfer event have been met, and if they have been met then allows said application initiator node to access and decrypt said private model.

In one or more of these embodiments, the private model is encrypted using homomorphic encryption. In some of these embodiments, the private model is encrypted using substantially homomorphic encryption. In one or more of these embodiments, the public key permits encryption of testing documents in the same manner as the private model so that the private model may be tested in cipherspace. In some of these embodiments, the secret key may be used to decrypt the private model.

BRIEF DESCRIPTION OF THE DRAWINGS

For a more complete understanding of the features and advantages of the present invention, reference is now made to the detailed description of the invention along with the accompanying figures in which:

FIG. 10A-B are a schematic diagram showing pairwise encryption of a CNN model using a second encryption method according to one or more embodiments of the present invention where FIG. 10A shows the original CNN model before encryption and FIG. 10B shows encryption of the original CNN model in cipherspace, n and m are dimensions of the weight matrix, k is the dimension of output matrix, r is a convolutional filter;

FIG. 11A-C are images of terminals showing scripts for operating an application initiator computing node (FIG. 11A), a Computing Contributor computing node (FIG. 11B), and a Verification Contributor computing node (FIG. 11C), according to one or more embodiments of the present invention;

DETAILED DESCRIPTION OF THE ILLUSTRATIVE EMBODIMENTS

Figure 1:
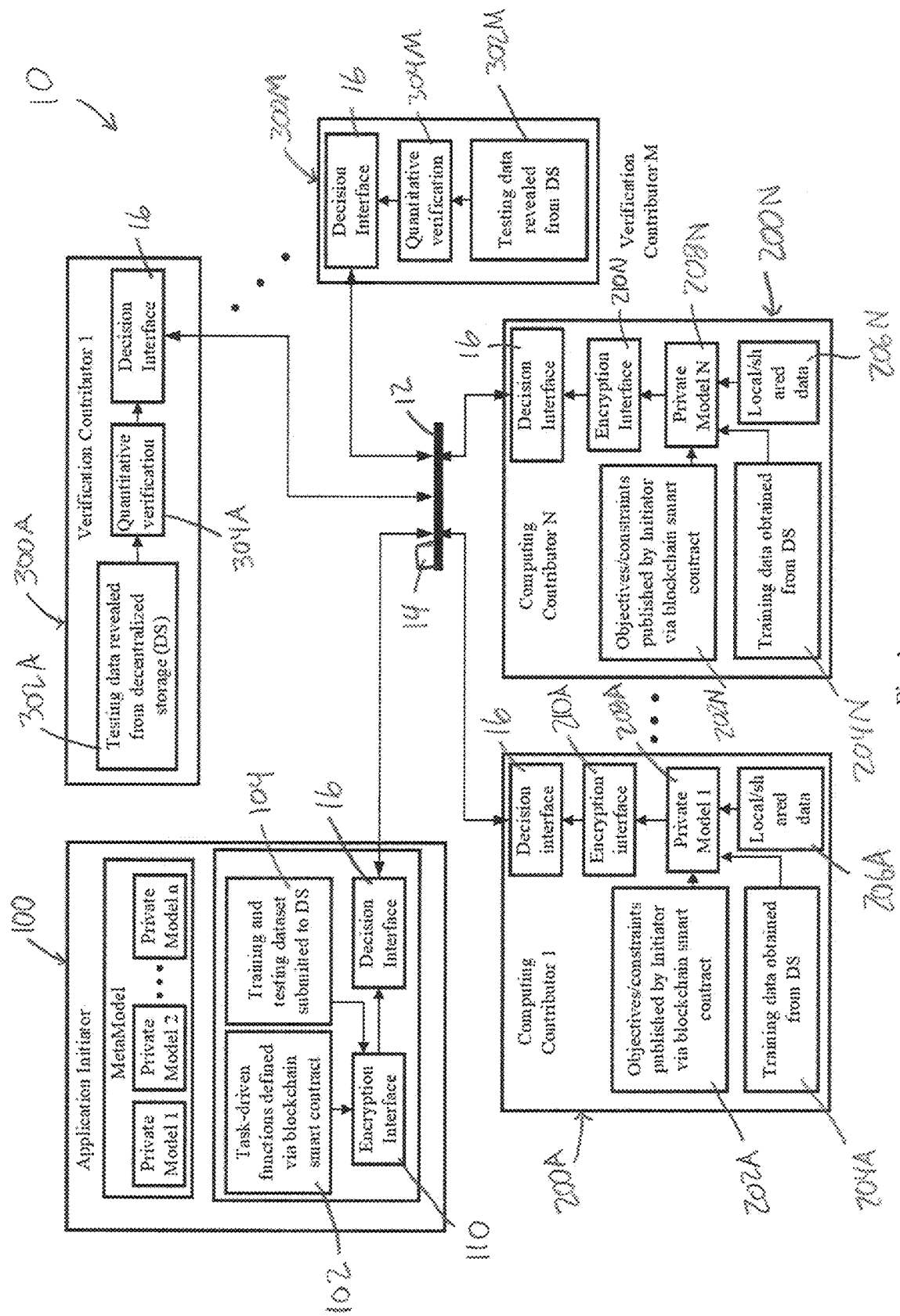
FIG. 1 is a schematic diagram providing a decentralized and secure computing system for developing machine learning models in accordance with one or more embodiments of the present invention.

The following is a detailed description of the disclosure provided to aid those skilled in the art in practicing the present disclosure. Those of ordinary skill in the art may make modifications and variations in the embodiments described herein without departing from the spirit or scope of the present disclosure. Unless otherwise defined, all technical and scientific terms used herein have the same meaning as commonly understood by one of ordinary skill in the art to which this disclosure belongs. The terminology used in the description of the disclosure herein is for describing particular embodiments only and is not intended to be limiting of the disclosure.

The following terms may have meanings ascribed to them below, unless specified otherwise. As used herein, the terms "comprising" "to comprise" and the like do not exclude the presence of further elements or steps in addition to those listed in a claim. Similarly, the terms "a," "an" or "the" before an element or feature does not exclude the presence of a plurality of these elements or features, unless the context clearly dictates otherwise. Further, the term "means" used many times in a claim does not exclude the possibility that two or more of these means are actuated through a single element or component.

All publications, patent applications, patents, and other references mentioned herein are expressly incorporated by reference in their entirety, which means that they should be read and considered by the reader as part of this text. That the document, reference, patent application, or patent cited in this text is not repeated in this text is merely for reasons of conciseness. In the case of conflict, the present disclosure, including definitions, will control. All technical and scientific terms used herein have the same meaning.

Further, any compositions or methods provided herein can be combined with one or more of any of the other compositions and methods provided herein. The fact that given features, elements or components are cited in different dependent claims does not exclude that at least some of these features, elements or components maybe used in combination together.

To address the issues facing implementation of big data analytics as outlined in the Background above, a decentralized and secure computing system is provided for developing machine learning models. The system employs blockchain smart contracts (a program executed on a blockchain platform having the ability to execute scripts, i.e., programming language that supports programs written for a run-time environment that automates the execution of tasks). Blockchain smart contract technology is employed to realize a secure, decentralized, and privacy-preserving computing system that incentivizes the sharing of computing power and computing intelligence from the public. It also incentivizes the sharing of private data or at least the sharing of resultant machine learning models from the analysis of private data. This system employs blockchain smart contract, decentralized learning, and software defined networking techniques, and can be widely implemented in different application fields, such as cognitive communications in deep space/near space exploration; next-generation vendor-independent data sharing and analysis; mobile cloud-sensing; and critical infrastructure monitoring and control.

In FIG. 1 a decentralized and secure computing system for developing machine learning models in accordance with various embodiments of this invention is shown and designated by the number 10. The system includes a peer to peer network 12, having a plurality of nodes, as generally known. The nodes can participate in the developing of machine learning models by acting as one of three different participants: application initiators, computing contributors, and verification contributors. The application initiator acts at the application initiator node 100. There is at least one computing contributor, and the computing contributors act at computing contributor nodes represented in FIG. 1 by a computing contributor node 200A and a computing contributor node 200N, indicating there can be any number n of computing contributor nodes. There is also at least one verification contributor, and the verification contributors act at verification contributor nodes represented in FIG. 1 by a verification contributor node 300A and a verification contributor node 300M, indicating there can be any number m of computing contributor nodes. All of the nodes on peer to peer network 12, including the application initiator nodes 100, computing contributors 200A, 200N, and verification contributors 300A, 300M, communicate with the smart contract and each other through the blockchain platform.

The application initiator node 100 initiates a request for participation in developing a machine learning model by initiating a smart contract on the blockchain platform. The smart contract defines the target performance criteria for a machine learning model to be developed through implementation of the system 10. The smart contract will also define compensation to participating nodes and other criteria for implementation of the system 10. Nodes willing to accept the task can become computing contributors nodes 220, 200N by processing data available to them to each locally generate their own private model using computing power and data available to each respective computing contributor 200, 200N, and then share that private model for assessment by nodes selected by the programming within the smart contract to be verification contributor nodes 300A, 300M. The verification contributor nodes 300A, 300M analyze the private models and establish which, if any, satisfy the target performance criteria in the blockchain smart contract. If the verification contributor nodes determine that target performance criteria are satisfied by a particular private model, the verification contributor nodes 300A, 300M then so informs the application initiator through the smart contract running on the blockchain platform. Assuming that all of the requirements of the smart contract have been met, verified private models are made available to the application initiator node and compensation paid to the computing contributor node and, in some embodiments, verification contributor nodes consistent with terms of the smart contract. Thus participation is incentivized, and the system does not suffer from security concerns in sharing private data, because private data can remain local and private to a given node.

As used herein, the term "node(s)" is to be understood in the nature of peer to peer (P2P) networks wherein computers are networked and are "peers" to each other in that all nodes share the burden of providing network services. Services are decentralized and nodes both provide and consume services with reciprocity acting as the incentive for participation. P2P networks are inherently resilient, de-centralized, and accessible to anyone which is a true reflection and foundation of the core characteristics of blockchain. Nodes include the necessary computing and communicative hardware and software to carry out the actions implicated for each node/participant in the system. This includes peer to peer networking and the generation and sharing of machine learning models. In some embodiments, the P2P network is selected from a software-defined network (SDN), TCP/IP network, and other suitable networking infrastructures. In some embodiments the P2P network is a SDN to realize the resilient peer-to-peer (P2P) networking infrastructure that enables flexible network configurations. One of ordinary skill in the art will be able to select the necessary hardware and software to form a node without undue experimentation.

In some embodiments, one or more nodes will be mobile computing devices, such as smart phones, tablets, drones, and other networkable mobile devices, each having an energy efficient microprocessor and system architecture. In one or more of these embodiments, these nodes may implement the big.LITTLE architecture (ARM Holdings, (Cambrideshire, UK)) which combines the energy-efficient cores like ARM Cortex-A53, and Cortex-A55 and the high-performance cores such as ARM Cortex-A57, Cortex-A72, Cortex-A73 and Cortex-A75 together. In some embodiments, for example, a Qualcomm Snapdragon 835 that utilizes the big.LITTLE architecture of an advanced version of ARM Cortex-A57 and Cortex-A53. As will be appreciated, Cortex-A53-based cores are often used to handle simple tasks and Cortex-A57-based cores are often used to handle heavy tasks on mobile devices.

A node in the peer to peer network 12 becomes an application initiator node 100 by initiating a smart contract on a blockchain platform; the smart contract begins an open opportunity for participation by other nodes in developing a machine learning model. The application initiator node 100 defines a task for generating a machine learning model, the task being defined through a blockchain smart contract, as at 102. In some embodiments, data for use by computing contributor nodes 200A through 200N in training and, if desired, testing their private models can also be provided by the application initiator node 100, as at 104. In some embodiments, the blockchain smart contract can include data for use by computing contributor nodes 200A, 200N in training and, if desired, testing their private models. It will be appreciated that some data sets might be too large for practical sharing through blockchain smart contract, so sharing data through other means, such as decentralized storage as noted herein, is helpful in many situations. In some embodiments, the application initiator node 100 provides an initial machine learning model (or "initial model") for use by the computing contributor nodes 200A, 200N.

To securely transfer data and computing models, a decentralized and distributed file storage and sharing mechanism is employed as shown at decentralized storage 14. Data and computing models shared, whether by application initiator nodes, computing contributor nodes, or verification initiator nodes are encrypted and provided to decentralized storage 14. Thus, encryption keys are generated to allow for decryption upon accessing data and/or computing models in decentralized storage 14. In some embodiments, when an application initiator node provides data or an initial model, it is encrypted and uploaded to the decentralized storage 14 as at encryption interface 110. The sharing of data, models, or other information within the peer to peer network 12, whether automated or performed by selective action, is symbolized by the communication with peer to peer network 12 at decision interface 16 (and is shown in FIG. 1 for each node in system 10).

After initiating a smart contract on the blockchain platform, the application initiator node 100 generates a public key and a secret key via homomorphic encryption technologies. In some embodiments, the public key and secret key are automatically generated by the smart contract. The public key allows for encryption of testing documents in the same manner as the private model so that the private model may be tested in cipherspace and serves to enhance the privacy preservation of the private models generated by the computing contributors. In addition, the computing contributors are able to use the public key to encrypt the locally generated computing model before announcing them in the blockchain platform for assessment. The secret key may be used (with its name and hash values) to enables the application initiator to retrieve the satisfactory private model, which is in cipherspace, as described below. In various embodiments, the public key is made available to both the verification contributor nodes and computing contributor nodes to enable them to encrypt the private models and testing documents. In some embodiments, the public key and secret key are delivered or sent to decentralized storage 14 automatically by the smart contract. More particular embodiments of this encryption process are addressed more fully below, particularly with respect to FIG. 6.

Virtually any decentralized storage system can be employed. In some embodiments the decentralized storage system is compatible with the blockchain platform being used for the smart contract. In some embodiments, an Interplanetary File System (IPFS) distributed file storage system is employed. Like blockchain, IPFS utilizes the peer-to-peer network to share and store hypermedia on the Internet.

The blockchain smart contract is programming defining objectives and constraints of the computing tasks, such as the properties of input data, the expected output of the tasks, and the verification criteria. The programming also has the ability to auto-execute process steps within the system as directed by the smart contract. In some embodiments, the visibility of the variables of a blockchain smart contract is controlled by using public-key cryptography technologies. In various embodiments, the control of the visibility of the names and the hash values of the computing models, which are carried via the blockchain smart contract, is realized by the public-key cryptography.

The blockchain smart contract can be executed through virtually any suitable blockchain platform. In some embodiments, the blockchain platform is selected from Ethereum, Ethereum Classic, EOS, DFINITY, Hyperledger, which all have engines and languages for implementing/executing smart contracts. As will be apparent, the software packages necessary to run the blockchain platform chosen for the smart contract must be installed on (or at least accessible to) all of the computers that will function as nodes in the peer to peer network 12. In some embodiments, the blockchain platform is the Ethereum platform. The Ethereum platform is an open-source, public, blockchain-based distributed computing platform and operating system featuring smart contract functionality. In these embodiments, the necessary software for running the Ethereum platform, including the engine Ethereum Virtual Machine (EVM) and language Solidity used to generate the smart contract, will be installed at all participating nodes. In these embodiments, the existence of the smart contract is available to each node of the blockchain platform.

Block events are used to carry the information of messages. Block events provide an interface of the logging facilities of the blockchain virtual machine. The event listener client application event listener.go will connect to a peer and receive block, rejection and custom chaincode events. A block event carries the entire block structure, and thus the event listener can print the result of all transactions in the block, either success or failure. In some embodiments, sending a message is considered as a transaction in the blockchain and will be recorded in the next new block. In some embodiments, reading a message just retrieves the information of existing blocks, and thus it is not a transaction and is not recorded in a new block In some embodiments, the smart contract provides additional security by recording and tracking the identities of every participant node. In such embodiments, the system 10 provides a decentralized application that can selectively assign different roles to different nodes. In some embodiments, every node wishing to join the smart contract will send a transaction to affirm that desired, and, in some embodiments, must include a security deposit of tokens. After such affirmation, the smart contract will record identifying information of the node and forward jobs like training (for computing contributor nodes) and verification (for verification contributor nodes) to them.

As set forth above, in some embodiments the smart contract is executed in the Ethereum platform and the smart contract is written in Solidity. In such embodiments, a solidity compiler is used to deploy the smart contract on the blockchain platform, the solidity compiler serving to transfer the raw source code of the smart contract to binary code. Then a python interface is used to interact with blockchain to deploy the smart contract. In some embodiments, web3.py is used for the python interface. The deployment is considered as a transaction and recorded to the blockchain. Once deployed, the blockchain platform (e.g., Ethereum) generates an address for the smart contract, and the address is then used to access the smart contract in the decentralized application.

Figure 2:
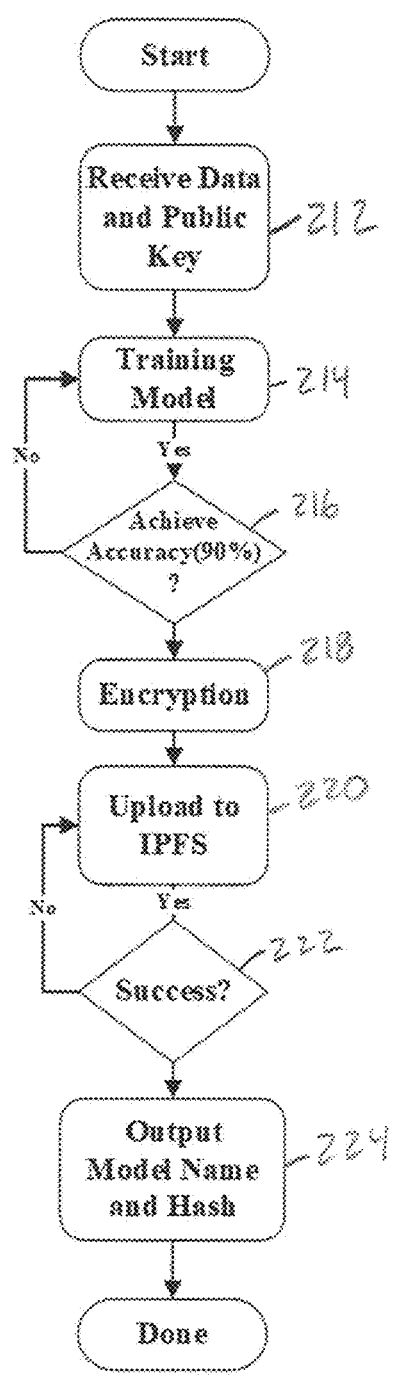
FIG. 2 is a schematic diagram showing workflows for a computing contributor node.

A node in the system 10 becomes a computing contributor node by agreeing to and generating private machine learning models for the task assigned by the blockchain smart contract from the application initiator node 100. Computing contributor nodes are represented in FIG. 1 by the numerals 200A and 200N, and this is to represent that there can be any number n of computing contributors (as also evidence by use of Model 1 in node 200A and Model N in node 200B. Computing contributor nodes 200A, 200N, receive the task as at 202A, 202N, and might also receive training data or initial machine learning models as at 204A, 204B. In some embodiments, the computing contributors have access to (1) a certain local data asset and/or shared data set, herein "contributor-available data" (see 206A, 206N) and/or (2) or a certain level of computing power and computing intelligence and participate in the process by designing and training an appropriate private machine learning model or models (herein "private model(s)") for the given task defined by the application initiator node, as at 208A and 208N. When a computing contributor node believes a learning model is sufficiently trained, it is encrypted and uploaded to the decentralized storage 14 as at Encryption interface 210A, 210N The training process of a computing contributor is shown in FIG. 2. The computing contributor nodes receive data and/or initial models (if provided by the application initiator node) and a public key as at 212, and begin training a private model as at 214. The private model is trained to have a desired level of accuracy, here shown by way of non-limiting example to be 90%, at 216. Once a desired level of accuracy is achieved with the private model, the computing contributor node encrypts it with the public key, as at 218 in the flowchart of FIG. 2 and as at encryption interface 210A of FIG. 1 and a secret key.

In some embodiments, the private model is encrypted by the blockchain platform using a homomorphic encryption method, as described further below. In these embodiments, a public key for use in encryption and a secret key for use in decryption are generated by the application initiator and/or the blockchain platform. In these embodiments, the public key as made available through the blockchain platform to the selected verification contributors and the computing contributors, but the secret key is made available only to the application initiator.

The computing contributor node provides the encrypted private models to the verification contributor nodes for quantitative verification either by direct transfer from the computing contributor nodes or by being uploaded to decentralized storage 14, as at 220. In some embodiments, the encrypted private model will be made available to the designated verification contributors through the blockchain platform upon its being uploaded to the decentralized storage 14. If the upload is successful, as at 222, an identifying name and hash are also generated, as at 224, to distinguish the private model from other private models similarly generated and provided by other computing contributor nodes. In these embodiments, the identifying name is linked to the identity computing contributor through the smart contract on the blockchain platform.

In some embodiments, the computing contributor nodes can leave or join the task at their convenience, making the system asynchronous and adaptive.

Figure 3:
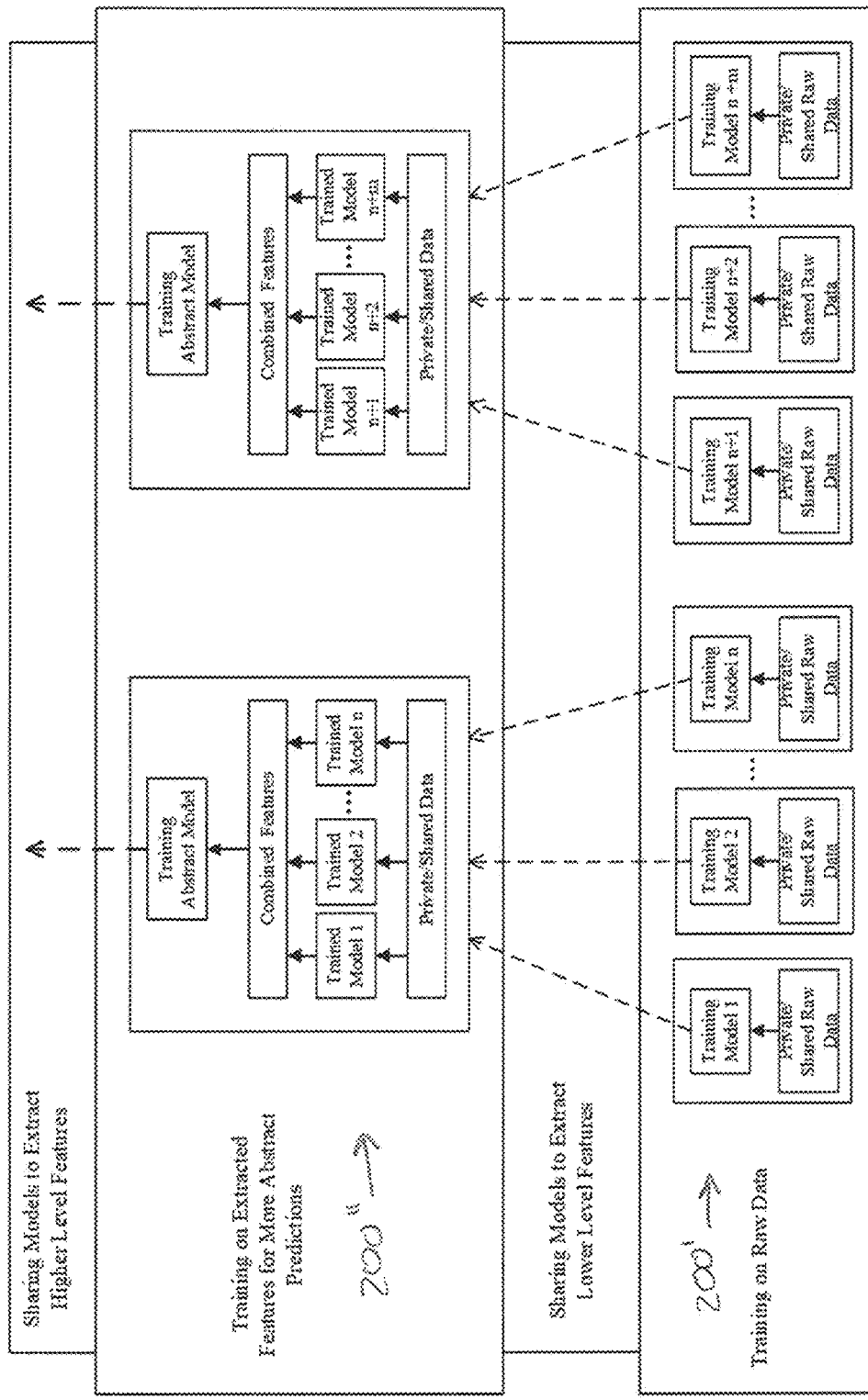
FIG. 3 is a schematic diagram providing an overview of a hierarchical structuring of computing contributors.

In some embodiments, and as seen in FIG. 3, an hierarchical structure is established between computing contributor nodes to allow a plurality of lower-level computing contributor nodes 200', to develop, from contributor-available data, lower-level private models (not numbered), for a data-driven task assigned by the application initiator node. The lower-lever computing contributor nodes 200' then share the lower-level private models with higher-level computing contributor nodes 200". Because of the hierarchical organization, each lower-level computing contributor node is required to train only a partial machine learning model, and the higher-level computing contributor nodes 200" perform a more challenging data-driven task. In FIG. 3 the higher-level computing contributor nodes 200" employ their respective contributor-available data and the lower-level private models provided by lower-lever computing contributors to combine models and otherwise train a higher-level private model, shown in FIG. 3 as "abstract model". This process could continue, with the higher-level computing contributors further sharing with yet higher-order computing contributor nodes. Additionally, those acting a computing contributor node for a given higher order task, such as nodes 200", can initiate a new smart contract to become an application initiator node for generation of lower-level private models from nodes, such as nodes 200', willing to be computing contributor nodes under the new smart contract.

Embodiments of the system 10 that employ a hierarchical structure can provide an efficient machine learning model when the computing power available for each contributor is limited and scattered. Hierarchical organization of machine learning structure is also suitable for training models that utilize multi-modal data. In the scenarios where the upper-level computing contributors do have access to multi-modal data, they can utilize lower level models trained to extract model specific features In some embodiments, the hierarchical structure is employed with low-computation power devices such as cell phones, tablets, drones, other networkable devices such as networked sensors, cameras, small appliances and virtually any device capable of sharing data or both computing and sharing data via a network. The ability to harness cell phone data and computational capabilities, while maintaining privacy through the system here proposed, could be very promising in developing machine learning models for protection of infrastructure, public safety, forecasting of natural disasters, and various medical applications.

Referring again to FIG. 1, verification contributor nodes are established once a pre-selected number of private models are available in decentralized storage 14, or as otherwise directed by the terms of the smart contract. In some embodiments, the number of private modes uploaded to decentralized storage 14 is monitored by the smart contract and, once the number of private models specified in the smart contract have been delivered, the smart contract automatically establishes the verification contributor nodes and provides each one with the public key and name and hash necessary to access the contributed private models. This is represented in FIG. 1 at the decision interface 16. In some embodiments, the select number in the smart contract is one or more, i.e., the delivery of a single private model results in the establishment of verification contributor nodes. In some embodiments, each verification contributor node will not start the verification process until it receives predetermined number training model results. In some other embodiments, the verification contributor nodes are not selected until a pre-determined numbers of models are available.

In various embodiments, the selection of nodes to be verification contributor node will be determined by the terms of the smart contract and is not particularly limited provided that there is at least one node that functions as a verification contributor node. In some embodiments, a node becomes a verification contributor node by being passively selected to quantitatively validate the contributions of private models provided by computing contributor nodes in the cipherspace. In some embodiments, a node becomes a verification contributor node by being randomly chosen from among the available nodes. In some embodiments, a node becomes a verification contributor node by being specifically chosen, for example on the basis of reputation or otherwise. In some embodiments, some nodes are randomly and some purposefully chosen to make up a plurality of verification contributors. Again, in some embodiments, selection is made automatically via smart contract. In some embodiments, the computing and verification contributor nodes can leave or join the task at their convenience, making the system asynchronous and adaptive.

In some embodiments, measures are taken to better ensure the security and privacy of the machine learning models and data. In some embodiments, verification contributors are randomly selected from participant nodes. In this case, each individual node has a very low possibility of being selected as a verification contributor node. It is thus difficult for a given node to cheat on verification and training. In some embodiments, a plurality of verification contributors are authorized to verify the collected private models, and each verification contributor votes their favorite combined model and the final model will be based on the majority rule of the votes. The random selection is realized via smart contract since the contract records the identities of all joined nodes. The vote of final models can be implemented easily in smart contract as well. In some embodiments, an encryption interface for machine learning is designed and embedded in the mechanism of the blockchain nodes to protect the model and data shared with verification contributors.

As at 302A, 302M, the verification contributor nodes 300A, 300M access private models as provided and encrypted by computing contributor nodes 200A, 200N and uploaded to the decentralized storage 14. The verification contributors validate private models according to the criteria (testing data) provided to it by the blockchain smart contract (as programmed by the application initiator) and/or the application initiator (through decentralized storage) by the smart contract. If upon quantitative verification, as at 304A, 304M, the private model is found to meet all of the applicable criteria set forth in the blockchain smart contract, this is recorded by the blockchain smart contract and/the blockchain platform. A private model that has been determined by a verification contributor node to satisfy the criteria of the task of a blockchain smart contract will be herein called a "verified model." In some embodiments, the application initiator node provides an initial model, and one verification criterion is the performance of the initial model or some aspect of the initial model must be improved by a certain degree by private model to be verified. In some of these embodiments, the encrypted initial model and the encrypted private model are merged in the manner set forth below for merger after encryption, and then compared to the encrypted initial model to determine the degree to which the encrypted private model is an improvement over the encrypted initial model meets the criteria for the smart contract.

Figure 4:
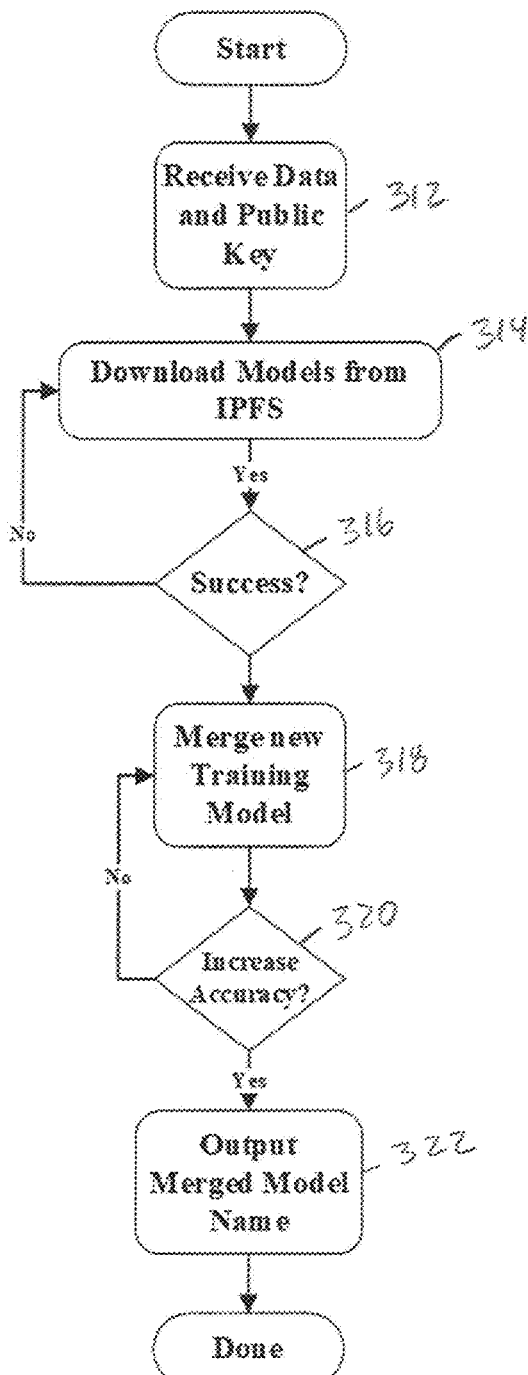
FIG. 4 is a schematic diagram showing workflows for a verification contributor node.

The flowchart of FIG. 4 illustrates the verification process for some of these embodiments where an initial model is provided by an application initiator node to be improved by the merging with one or more private models. Once selected, the verification contributor nodes receive data and a public key as at 312. In some embodiment, this is carried out automatically as part of the blockchain smart contract. The verification contributor nodes access private models, as at 314, through the public key as used by the computing contributors to encrypt the private model sent to decentralized storage 14. At 314, the verification contributors are also able to access initial machine learning models provided by the application initiator node. Once successfully downloaded as at 316, the private models are individually merged with the initial machine learning model provide by the application initiator, as at 318, to determine if incorporation of a private model increases accuracy over the initial machine learning model (or, more broadly, satisfies the conditions of the blockchain smart contract), as at 320. In some embodiments, two or more private models are merged with the initial machine learning model provide by the application initiator to determine if incorporation of a particular combination of private models increases accuracy over the initial machine learning model (or, more broadly, satisfies the conditions of the blockchain smart contract).

In some embodiments, the identification of a single verified model may or may not be sufficient to trigger a transfer event, depending upon the terms of the smart contract. In one or more embodiments, a "transfer event" will include granting the application initiating node access to the verified model upon payment to the computing contributor node responsible for the verified model and some or all of the verification contributor nodes consistent with the terms of the smart contract. In some embodiments, the identification of a single verified model is sufficient to trigger a transfer event. In some embodiments, a private model must be identified as a "verified model" by a majority of the verification contributor nodes assigned to trigger a transfer event. In some embodiments, a private model must be identified as a "verified model" by a predetermined number of verification contributor nodes to trigger a transfer event. In some other embodiments, a private model must be identified as a "verified model" by a certain verification contributor node, one of a group of verification contributor nodes, or a verification contributor from each of several groups of verification contributor nodes to trigger a transfer event.

As set forth above, to access and decrypt the verified model, the application initiator node need the secret key formed when it was encrypted, the name of the its corresponding file on the decentralized storage, and its hash value. The application initiator node was allowed to access to at or near the beginning of the process. However, the control of the visibility of the names and the hash values of the computing models, which are carried via the blockchain smart contract, is realized by the public-key cryptography.

When the appropriate terms of the smart contract have been satisfied and a transfer event triggered, the smart contract will make the name of the file corresponding to the verified model saved in the decentralized storage available to the application initiator node. As set forth above, the file name is linked to the name of the computing contributor that provided the verified model. At this point, the payment required by the smart contract for providing the verified model is made to the computing contributor and verified by the smart contract. In some embodiments, payment is also made at this time to one or more of the verification contributors are required by the smart contract. In some embodiments, these payments are made through the blockchain platform. In some embodiments, the amount and type of compensation is defined in the blockchain smart contract. In some embodiments, the compensation is defined in the blockchain smart contract, and compensation is in the form of the digital currency of the blockchain technology employed. Upon verification that the payments have been made, the application initiator node is permitted access to the hash value for the verified model. This allows the application initiator node to obtain and decrypt the verified model.

In some embodiments, there is a limited amount of time for delivery of private models to verification contributor nodes. In some embodiments, there is a limited amount of time for delivery of private models to verification contributor nodes and analysis and analysis, and thus, there is a limited time window for contributing to a given data-driven task (i.e., satisfying the terms of the blockchain smart contract). In some embodiments, then the time window is closed, the application initiator node automatically, by operation of the smart contract, decrypts the received private model or merged model with the secret key and fuses them to achieve a MetaModel for its data-driven task, as at 106, FIG. 1.

As illustrated in FIG. 1, the success of crowdsourced artificial intelligence (AI) computing infrastructure requires an effective mechanism to integrate the various verified computing models provided by the individual computing contributors and a working model provided by the application initiator, if any, and achieve a functional computing model, with high performance for the targeted task. Furthermore, in the strategy for fusing the individual models, it is necessary to treat the computing models, provided by the computing contributors, as separate entities, to ensure the fused structure, called MetaModel, is dynamic.

Figure 5:
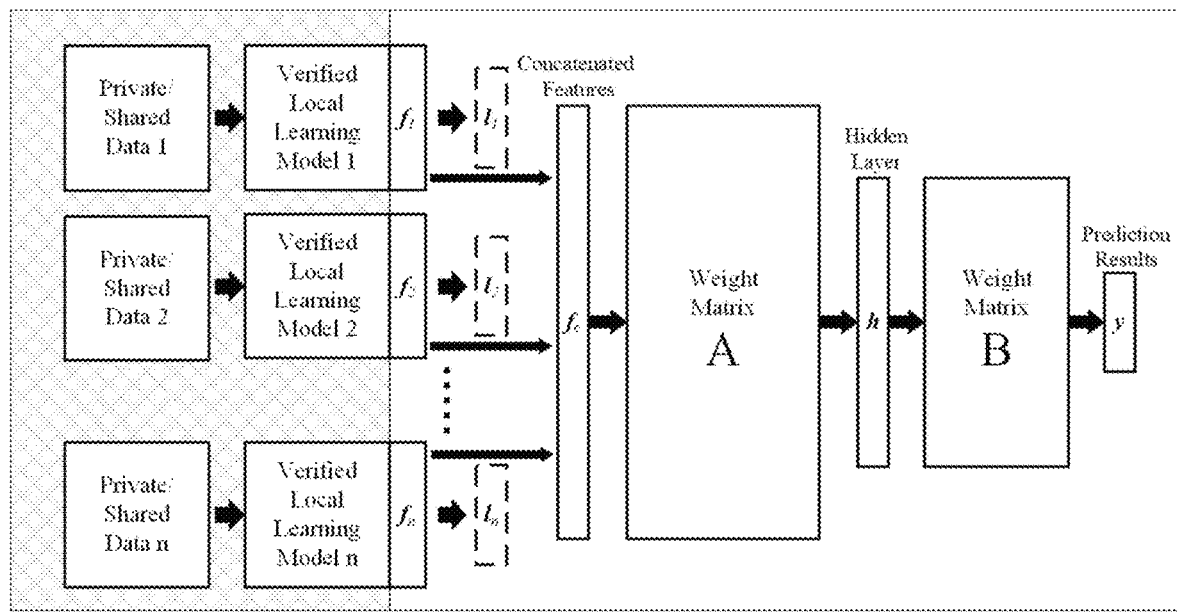
FIG. 5 is a schematic diagram showing Multi-Model Fusion according to one or more embodiments of the present invention.

FIG. 5 illustrates the structure of one model fusion unit for a classification task. The model-fusion strategy consists of two layers, each of which is achieved by calculating a weighted sum of the corresponding values of the previous layer. As shown in FIG. 5, the upper layer feature vectors from n shared models are concatenated to form a concatenated feature $f_c$, calculated based on $f_i$, which refers to the upper layer feature vector of the ith model. A hidden layer h with a size of $\Sigma_{i=1}^{n}|l_i|$, where $|l_i|$ is the number of labeled classes in the ith model is calculated as the weighted sum of the concatenated feature vector. For a verification task, the private data used with each model are shared by the initiator of the task. In various embodiments, strategies for learning the optimum values for weight matrices A and B in FIG. 5 may include, without limitation, Strategies I and II below.

Strategy I

In these embodiments, the hidden layer h and output layer y are calculated based on the fully connected weights A and B with no constraints, as shown in Equations (1) and (2), respectively. Weight matrices A and B are initiated randomly and a backpropagation algorithm is used to calculate the optimum values for the weight matrices A and B. (See, I. Goodfellow, Y. Bengio, and A. Courville, *Deep Learning*. MIT Press, 2016, ttp://www.deeplearningbook.org., the disclosure of which in incorporated herein by reference in its entirety). The output of the hidden layer h, may be calculated using Equation 1, below.

$$h_j = \Sigma_{i=1}^{|f_c|} A_{ij}^T f_{c_i} \quad (1)$$

where j is the index of the hidden layer units, $h_j$ is the jth unit for the hidden layer h, $f_c$ is the concatenated feature vector, A is a weight matrix, T indicates the transpose operation, and $A_{ij}^T$ refers to the ijth element of transposed Matrix A. The output of the final layer consists of probabilities may be calculated via a SoftMax function, as shown in Equation 2 below:

$$y_j = \frac{\exp\left(\sum_{i=1}^{|h|} B_{ij}^T \cdot h_i\right)}{\sum_{k=1}^{d} \exp\left(\sum_{i=1}^{|h|} B_{ij}^T \cdot h_i\right)} \quad (2)$$

Where j is the index of the output layer units, $y_j$ is the jth output unit, d is the number of labeled classes, B is a weight matrix, $B_{ij}^T$ refers to the ijth element of the transpose of Matrix B, and $B_{ik}^T$ refers to the ikth element of the transpose of Matrix B.

Strategy II:

These embodiments utilize a gradual model-fusion in which the correlation between the different computing models is learned, while the uniqueness of each computing model is preserved. In some of these embodiments, the weight matrix A is initialized as a concatenated matrix as shown in Eq. (3), where a diagonal weight matrix $W_i$ has dimensions ($|f_i|$, $|l_i|$) and is initialized randomly. In some embodiments, the weight matrix B is initialized with the concatenation of the identity matrices, as shown in Eq. (4), where n is the number of machine learning models fused and d denotes the number of class labels.

$$A_{init} = \begin{bmatrix} W_1 & 0 & 0 & \cdots & 0 \\ 0 & W_2 & 0 & \cdots & 0 \\ 0 & 0 & W_3 & \cdots & 0 \\ \vdots & \vdots & \vdots & \ddots & \vdots \\ 0 & 0 & 0 & \cdots & W_n \end{bmatrix} \quad (3)$$

$$B_{init} = \begin{bmatrix} w_{111}=1 & 0 & 0 & \cdots & 0 \\ 0 & w_{122}=1 & 0 & \cdots & 0 \\ 0 & 0 & w_{133}=1 & \cdots & 0 \\ \vdots & \vdots & \vdots & \ddots & \vdots \\ 0 & 0 & 0 & \cdots & w_{1dd}=1 \\ w_{211}=1 & 0 & 0 & \cdots & 0 \\ 0 & w_{222}=1 & 0 & \cdots & 0 \\ 0 & 0 & w_{233}=1 & \cdots & 0 \\ \vdots & \vdots & \vdots & \ddots & \vdots \\ 0 & 0 & 0 & \cdots & w_{2dd}=1 \\ w_{n11}=1 & 0 & 0 & \cdots & 0 \\ 0 & w_{n22}=1 & 0 & \cdots & 0 \\ 0 & 0 & w_{n33}=1 & \cdots & 0 \\ \vdots & \vdots & \vdots & \ddots & \vdots \\ 0 & 0 & 0 & \cdots & w_{ndd}=1 \end{bmatrix} \quad (4)$$

As set forth above, weight matrices A and B in some embodiments are trained using a backpropagation algorithm. As will be appreciated by those of skill in the art, backpropagation is a method used in neural networks to calculate a gradient that is needed in the calculation of the weights to be used in the neural network. Backpropagation algorithms are commonly used in training models in machine learning applications. One of ordinary skill in the art will be able to create a suitable backpropagation algorithm without undue experimentation.

In the initial iterations of training in some of these embodiments, only the diagonal non-zeros weights, shown in Eqs. (3) and (4), are updated. In the later iterations of training, all of the weights in A and B are updated. This two-stage training strategy is formulated in Eqs. (5) and (6), where the parameter γ is set as 0 in the initial stage (Eq. 5) and as 1 in the final stage (Eq. 6). The value of the hidden layer h at the at the jth hidden layer node may be calculated using Eq. (5) as follows:

$$h_j = \Sigma_{i=1, A_{ij} \in W}^{|f_c|} A_{ij}^T f_{c_i} + \gamma \Sigma_{i=1, A_{ij} \notin W}^{|f_c|} A_{ij}^T f_{c_i} \quad (5)$$

where W refers to the collection consisting of the elements of $W_k$, where k=1, . . . , n, as defined in Eq. (3). The value of the output layer unit $y_j$ may be calculated using Eq. (6) as follows:

$$y_j = \frac{\exp\left(\sum_{i=1, B_{ij} \in \tilde{W}}^{|h|} B_{ij}^T \cdot h_i + \gamma \sum_{i=1, B_{ij} \notin \tilde{W}}^{|h|} B_{ij}^T \cdot h_i\right)}{\sum_{k=1}^{d} \exp\left(\sum_{i=1, B_{ik} \in \tilde{W}}^{|h|} B_{ik}^T \cdot h_i + \gamma \sum_{i=1, B_{ik} \notin \tilde{W}}^{|h|} B_{ik}^T \cdot h_i\right)} \quad (6)$$

where $\{1, 2, 3 \ldots, d\}$ and d is the number of labeled classes, and $\tilde{W}$ refers to the collection consisting of the elements $w_{ij}$, where $i=1, \ldots, n$ and $j=1, \ldots, d$, as defined in Eq. (4).

In some other embodiments, the parameter γ is set as 0 in the initial stage and gradually increased to 1 for the final stage. In one or more of these embodiments, the parameter γ is increased each time the backpropagation algorithm is run until it reaches 1

In some embodiments like that shown in FIG. 1, the decentralized and secure computing system for developing machine learning models of the present invention employs an encryption interface to encrypt the private models generated by the individual computing contributor nodes and the data shared by the application initiators to enhance the security and privacy-preservation of the system. In these embodiments, this can be necessary to prevent untrustworthy verification contributor nodes from utilizing the shared models in undesirable ways. It can be important, for example, to prevent the verification contributor nodes from providing the machine learning models to entities other than the application initiator node. In some embodiments, it is also important in these embodiments to prevent the verification contributor from taking advantage of the learning model for its own benefit and/or holding itself out as a computing contributor, which would amount to theft from the computing contributor(s) that actually provided the learning model. In some embodiments, it is also important that the verification contributors be prevented from applying machine learning methods such as generative adversarial networks (GANs) methods to reverse engineer a computing contributor's data using the shared model, which would violate data privacy. For at least these reasons, various embodiments of the decentralized and secure computing system for developing machine learning models of the present invention include a homomorphic encryption (HE)-based encryption interface. This interface is designed to ensure the security and the privacy-preservation of the shared learning models, while minimizing the computation overhead for performing calculation on the encrypted domain and, at the same time, ensuring the accuracy of the quantitative verifications obtained by the verification contributors in the cipherspace.

Figure 6:
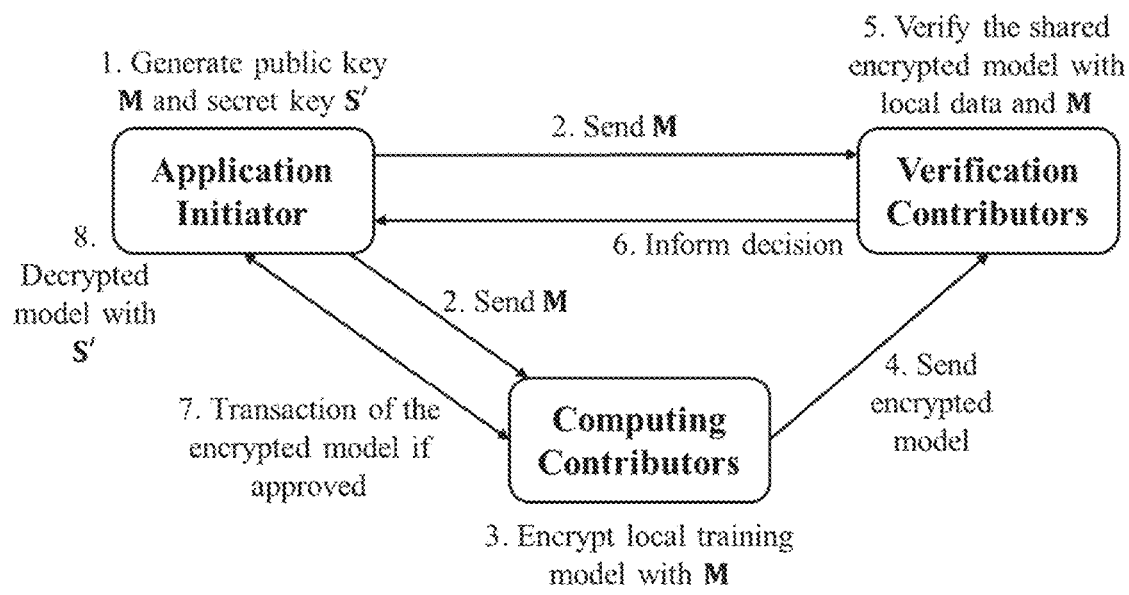
FIG. 6 is a schematic diagram illustrating the mechanism of an encryption interface according to one or more embodiments of the present invention.

The overall mechanism of the encryption interface is illustrated in FIG. 6, and mainly comprises the following eight steps: (1) the application initiator generates the public key M and the secret key S' via the HE technique, (2) the application initiator sends the public key M to both the verification contributors and computing contributors, (3) the computing contributors encrypt the local training model by using M, (4) the computing contributors send the encrypted training model to the verification contributors for quantitative verification, (5) the verification contributors verify the learning models, which are claimed by the computing contributors, in the cipherspace by using M and the data shared by the application initiators, (6) the verification contributors inform application initiator of the conclusions on the contributions of the claimed learning model, (7) if the necessary criteria in the smart contract have been met, the transaction of the encrypted learning model between the associated computing contributor and the application initiator is established, and (8) the application initiator decrypts the training model with the secret key S'. As can be seen, this method uses the public key to enable encrypting the private models generated by the computing contributors and to permit testing by the verification contributors in the homomorphically encrypted cipher domain (cipherspace).

Execution of machine learning models may be viewed as combinations of simple "building block" operations. Most commonly used "building block" operations can be listed as addition, vector addition, vector multiplication with scalar, vector dot product, vector matrix multiplication, pooling operations, convolution operations, and nonlinear activation functions. Above basic operations may be achieved in homomorphically encrypted cipherspace except pooling operations, convolution operations, and non-linear function realizations. In one or more embodiments, these homomorphically encryption methods are modified to pooling operations, convolution operations, and non-linear function realizations in cipherspace.

In these embodiments, the average pooling and summation pooling operations are performed in cipherspace by summation of the elements followed by a division by an integer and the convolution operations are realized via vector multiplication operations in cipherspace. In some embodiments, the nonlinear functions are calculated by adopting polynomial approximations. As an example, a polynomial approximation of sigmoid activation functions $$\sigma(x) = \frac{1}{1+e^{-x}}$$

can be approximated as the polynomial $$\tilde{\sigma}(x) = \frac{1}{2} + \frac{x}{4} - \frac{x^3}{48}.$$

Considering the tradeoffs between the computational complexity, security, and the available functionality of models, we exploit HE methods that inherently archive most widely used activation functions.

Most widely used activation functions in machine learning architectures are some variation of rectifier linear units (ReLUs). These are piece-wise linear functions where discontinuity is observed at x=0 (ReLU(x)=max(0,x)). If there is sign change, it is difficult to implement the ReLU function in the cipherspace. HE schemes that support the selected set of operation (vector addition, vector multiplication with scalar, vector dot product, vector matrix multiplication, pooling operations, convolution operations, and nonlinear activation functions) are known as "somewhat homomorphic encryption" (SHE) schemes. In these embodiments of the encryption interface, the public and secret keys are constrained to be non-negative, so that there are no sign changes while encrypting, and ReLU can be realized inherently in cipherspace. In various embodiments, the encryption interface may be used with both integer and floating-point operations.

In some embodiments, SHE scheme used is called Homomorphic Encryption on Integer Vectors See, H. Zhou and G. Wornell, "Efficient homomorphic encryption on integer vectors and its applications," 2014 Information Theory and Applications Workshop (ITA), San Diego, Calif., 2014, pp.

1-9, the disclosure of which is incorporated by reference in its entirety. This encryption scheme supports the evolution of polynomials through weighted inner product operation. The public key M and secret key S' are obtained via the key switching of this SHE technique. Letting S and c be the original secret key and ciphertext, respectively, the calculate the public key can be calculated as $$M = \begin{bmatrix} TA + S^* + E \\ A \end{bmatrix},$$

which enables the desired secret key S'=[I,T] and the corresponding ciphertext c'=Mc*, where I is an identity matrix and T is a reproducible secret vector, c* is the representation of c with each digit of c represented as a l-bit binary number, S* is an intermediate key satisfying S*c*=Sc, and A and E are random and bounded matrices.

As will be apparent, in this SHE scheme, the dimensions of the plaintext and the corresponding ciphertext are different (for example, if the plaintext is an N-dimensional vector, then the ciphertext is an (N+1)-dimensional vector), creating problems for implementing neural networks in the cipherspace, since both the feedforwarding and back-propagation require the consistence of the dimensions. As used herein, the term "neural network" refers to a computing infrastructure inspired by the biological neural networks that constitute animal brains. As used herein the term "convolutional neural network" (CNN) is a type of neural network characterized by the presence of one or more convolutional layers, one or more pooled layer and one or more fully connected neural network layers.

Figure 7:
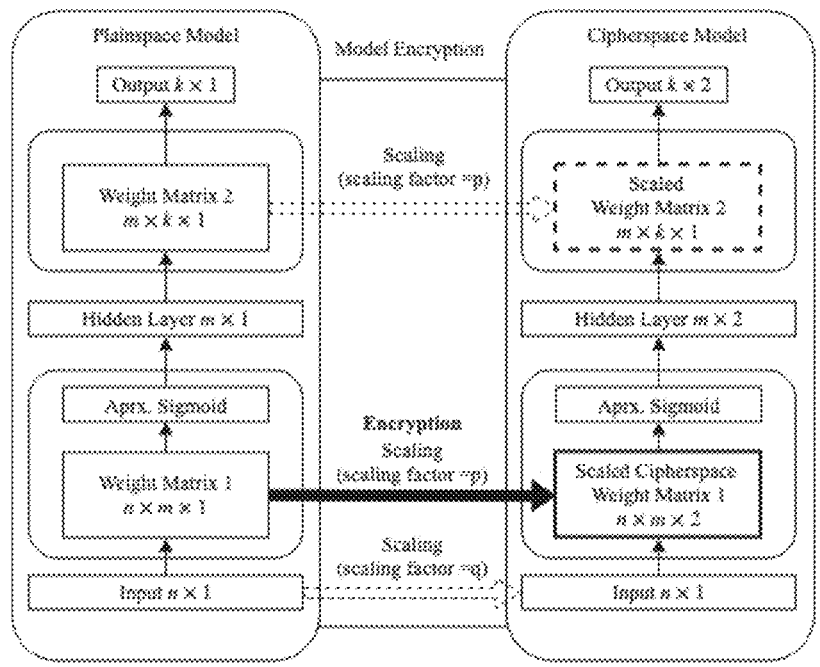
FIG. 7 is a schematic diagram outlining a method of homomorphic encryption and cipherspace execution of a fully connected neural network according to one or more embodiments of the present invention, where n and m are dimensions of the weight matrix, k is the dimension of output matrix.
Figure 8:
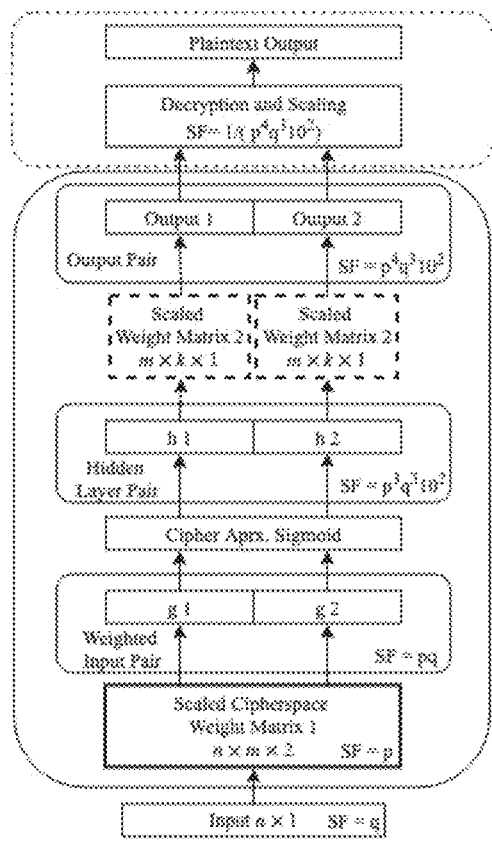
FIG. 8 is a more detailed schematic diagram showing the cipherspace model shown in FIG. 7, SF is the cumulative scaling factor, g1 and g2 are weighted inputs.
Figure 9:
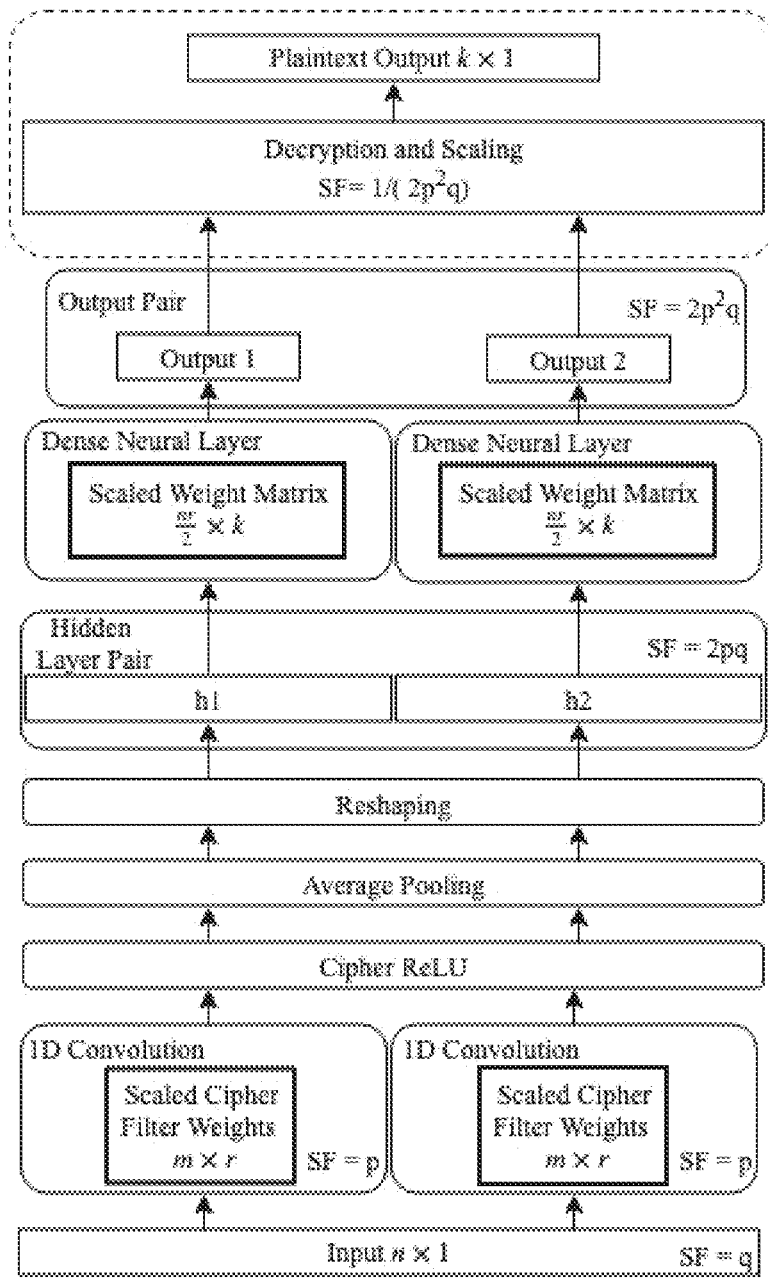
FIG. 9 is a schematic diagram showing a method of homomorphic encryption and cipherspace execution of a convolutional neural network (CNN), where n and m are dimensions of the weight matrix, k is the dimension of output matrix, $h_1$ and $h_2$ are hidden layer units, and SF is the cumulative scaling factor.

In some embodiments, the problems with dimensions of the plaintext and the corresponding ciphertext being different in these SHE schemes is addressed as shown in FIG. 7 (method-1). In these embodiments, the scaled weight matrix element is encrypted by element and a third dimension is expanded in cipherspace. And while as set forth above, the encryption interface is designed for both integer and floating-point operations, scaling factors are used to convert any floating-point operations to integer operation. As shown in FIG. 8, this results in scaled hidden and output layer pairs when executing the model in cipherspace. The learning model considered in FIGS. 7 and 8 is a fully connected neural network with sigmoid activation function. Only first layer weights are encrypted, considering it is meaningless knowing the 2nd layer weights without knowing first layer values of the neural network. FIG. 9 illustrates the use of this method for a convolutional neural network (CNN) with r convolutional filters in first layer.

In some other embodiments, the encryption is performed on a pair of neighboring weight matrices (method-2). As shown in FIG. 10, dimension of encryption is carefully selected such that there will be no dimension mismatch while executing the model in the cipherspace. It is believed that that these two methods can be applied to implement neural networks in cipherspace without the limitations of the types of the neural networks and the structures of the neural networks

EXPERIMENTAL

Raspberry PI embedded single board computing platforms and NVIDIA Jetson embedded computing platform were used to evaluate and further reduce to practice the blockchain-based decentralized learning architecture of the present invention.

I. Architecture Realization

In these embodiments, a testbed was prepared using multiple Raspberry PI modules to simulate nodes. In order to simulate the functionality of a computing contributor, python-based scripts are used to perform cooperative machine learning tasks. (See FIGS. 11A-C). In order to test the functionality of the blockchain-based decentralized learning architecture of the present invention on the testbed, two experiments are implemented. The first experiment was to classify MNIST handwritten digit database (See, e.g., Y. LeCun, "The mnist database of handwritten digits," http://yann.lecun.com/exdb/mnist/, 1998, the disclosure of which is incorporated herein by reference in its entirety). The second experiment is to detect the fading channel based on a signal power database collected of 11 events recorded as downlink RF signals using SCaN testbed in NASA Glenn Research Center.

A. System Requirement and Structure

All system and software requirements are shown in Table 1. The testbed is built on two types of embedded systems, Raspberry PI and Jetson TX2. The processor of Raspberry PI is a quad-core ARM Cortex-A53 cluster whose core is the first generation of 64-bit ARMv8. Jetson Tx2 contains dual-core NVIDIA Denver 2 CPU and a quad-core Cortex-A57 CPU. Both are still ARMv8 64-bit CPU. Cortex-A53 is an energy-efficient architecture which is widely used in processors of mobile devices and ARM Cortex-A57 is a typical high-performance architecture. These two embedded systems were selected to verify the possibility of running the framework on mobile devices because they are the most widely adopted CPU solutions for mobile devices. The hardware and software used in these experiments is set forth in Table I, below.

TABLE I

The Software and Hardware Configuration for These Experiments

| Module Name | Description | Version |
| --- | --- | --- |
| Linux Header | OS Kernel | V3.10.3-RPI & LTS 4.9 |
| Ryu | SDN Controller | V4.23 |
| Open vSwitch | SDN Switch | V2.54 |
| netem | Networking Emulator | V2.6 |
| go-ipfs | IPFS Client | V0.4.19 |
| Geth | Ethereum Client | V1.8.3-ARMv7&ARM64 |
| Puppeth | Ethereum Private Chain Manager | V1.8.3-ARMv7&ARM64 |
| Solc | Solidity Compiler | V0.4.23 |
| web3.py | Python API of Ethereum Client | V4.9.1 |
| Ipfs-api.py | Python API of IPFS Client | V0.2.3 |
| tensorflow | Framework of machine learning | V1.3 |

Figure 12:
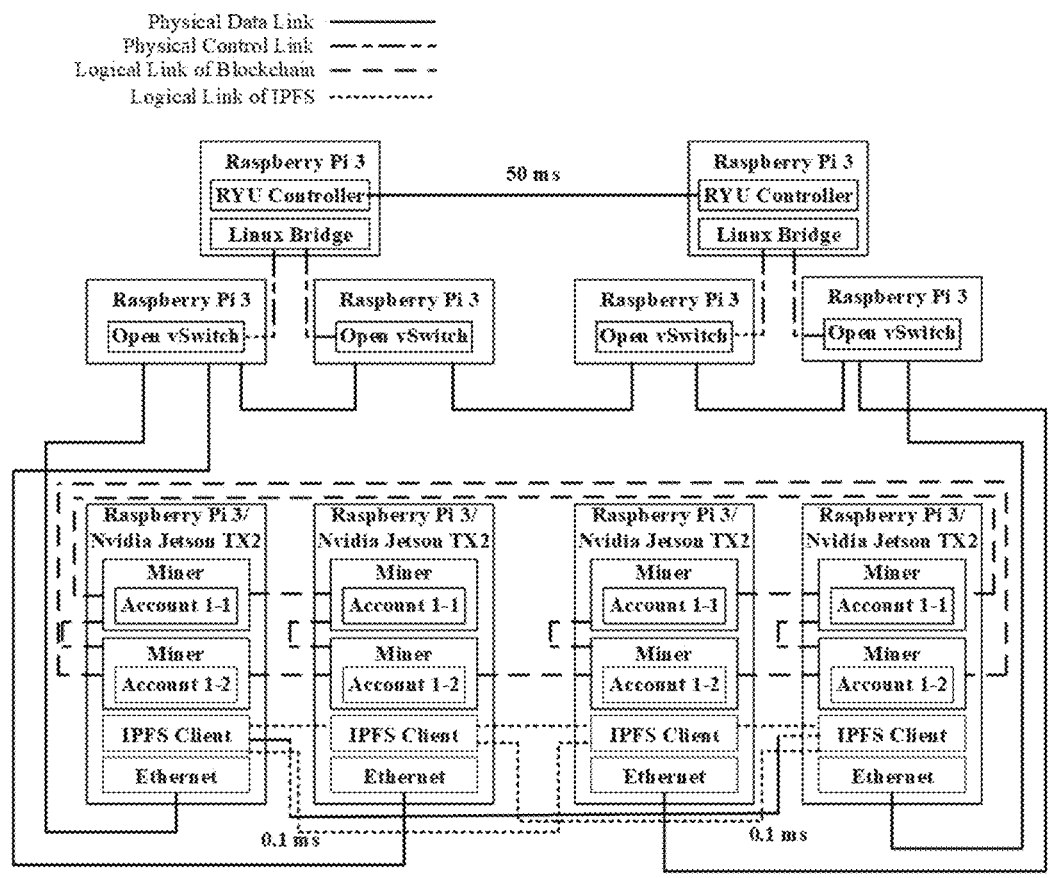
FIG. 12 is a schematic illustration of a software-defined network (SDN)-based blockchain network according to one or more embodiments of the present invention.

Network: In these experiments, a software-defined network (SDN) having peer-to-peer (P2P) networking infrastructure was used. This provided for flexible network configurations and global controls of the P2P blockchain network used. The SDN-based networking infrastructure allowed for optimization of the QoS control policy for smart switches, which guaranteed the communication efficiency of P2P network for blockchain. A hierarchical SDN controller scheme was employed to ensure the scalability of the P2P blockchain network. Multiple controllers were peered and collaborated with each other via eastbound and westbound protocols. FIG. 12 shows the interaction between the individual SDN controller and the SDN switches in the SDN-based networking infrastructure used. The top nodes were the individual SDN controllers. The middle four nodes are configured as four SDN switches belonging to the domains of one of the SDN controllers. The applications of all the bottom nodes communicated with each other via the physical data links. The selected Linux kernel V3.10.3 ensures the appropriate functionality of Open vSwitch on Raspberry PI. RYU and Open vSwitch were adopted to construct the SDN. OpenFlow 1.3 was selected as the southbound protocol between controller and switch. Netem was used to emulate wide area network physical links and was also used to increase the latency of some physical links to emulate the heterogeneous geographical relations amongst computing or data assets, as shown in FIG. 12. In the system tested, the physical data link delay between two of the Open vSwitches was set to be longer such as 50 milliseconds, and were considered for purposes of these experiments to be two switches located in different areas with a long physical delay. Physical data links between application nodes were set to much shorter time delay of 0.1 milliseconds. This topology is believed to be appropriate to simulate the communication networks between the satellites in the orbits of different planets. It is also believed to be effective to simulate correlative and decentralized learning among mobile devices.

Blockchain: As set forth above, various blockchain frameworks have been developed, including, without limitation, Ethereum, Ethereum Classic, EOS, DFINITY, and Hyperledger. Each framework has its own engine and language for smart contract. For these experiments, a decentralized application (DApp) on the Ethereum was utilized and the engine and language of smart contract were Ethereum Virtual Machine (EVM) and Solidity. The genesis block was generated by Puppeth (Ethereum), which serves as a manager for the Ethereum Virtual Machine (EVM). The consensus protocol was set to Proof-of-Authority since the 32-bit OS of the Rasberry PIs used do not fully support proof-of-work consensus protocols. The block interval was set to 15 seconds and all sealers were initialized with a small number of tokens. A diagram of the SDN-based blockchain network used for these tests is shown in FIG. 12. As can be seen, in this SDN-based blockchain network, there are eight peers (miners) uniformly distributed in the four bottom nodes. Every peer connects to its local neighbor peer and two remote peers, which ensures that the peer-to-peer network is not fully meshed but is still distributed.

Decentralized Storage: To realize the transaction of the data and computing models, a decentralized storage was used. In these experiments, the Interplanetary File System (IPFS) distributed file storage system was used. Like blockchain, IPFS utilizes the peer-to-peer network to share and store hypermedia on the Internet. As shown in FIG. 12, in the architecture of these embodiments of the present invention, each bottom node has one decentralized distributed file storage client (here IPFS) and connects two remote IPFS clients. Since the whole simulation was running on a private network, a shared swarm key was used to authorize reliable nodes to join IPFS.

Smart Contract: In these experiments a smart contract was written in Solidity on the Ethereum blockchain platform, defining the criteria for the experiments as discussed below. The web3.py program was used to interact with the smart contract in Ethereum. The deployment the smart contract on Ethereum provides the other nodes with the address necessary to access the smart contract. This address was then used to access smart contract in DApps.

Web-based application: For these experiments, DApps were developed in Python, which is often used for machine learning frameworks. To be reactive to new incoming or outgoing messages from or to smart contract, each node was set with several asynchronized event listeners with callback functions which were designed to ensure that DApp on each node could handle different events simultaneously. (See FIGS. 13-15) Meanwhile, web3.py and ipfs-api.py were used to provide access to Ethereum and IPFS clients in order to transceiver messages and files via the smart contract and IPFS respectively. Tensorflow, a deep learning framework with Python bindings, was selected to carry on the work of machine learning.

B. DApp Workflow

Figure 13:
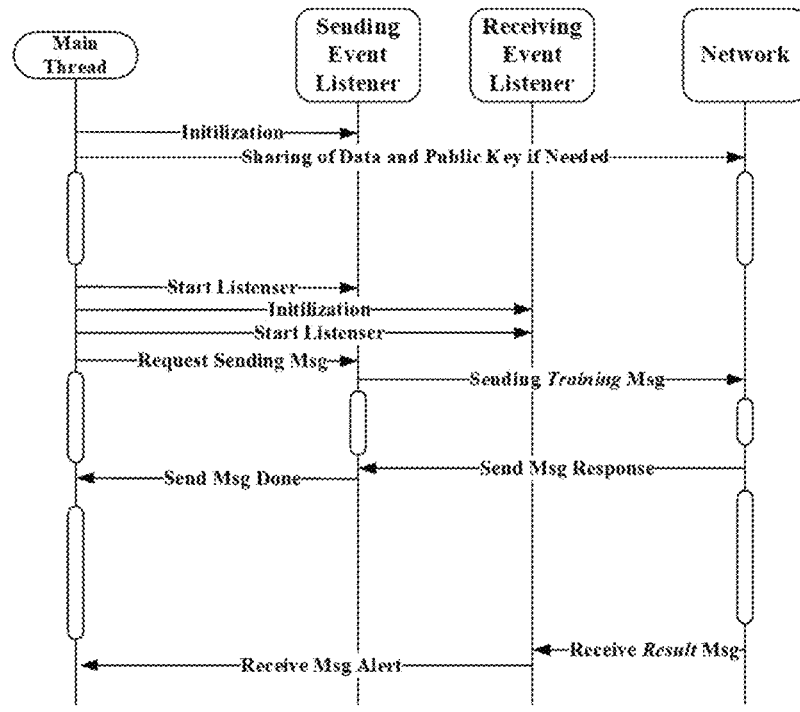
FIG. 13 is a schematic diagram showing workflow of an application initiator computing node according to one or more embodiments of the present invention.

In the embodiments of the infrastructure tested, DApp defined three roles for the computing nodes: application initiator, computing contributor, and verification contributor as outlined above. As set forth above, each application initiator publishes training task on smart contract and it will eventually receive final result. The workflow of the application initiator computing nodes in these experiments is shown in FIG. 13. The Sending Event Listener and Receiving Event Listener were configured to handle message events. In these experiments, the callback functions of each listener could be called asynchronously through Asynchronous I/O (asyncio) library of Python. Asyncio is a Python library often used to write concurrent code using the async/await syntax and is used as a foundation for multiple Python asynchronous frameworks that provide high-performance network and web-servers, database connection libraries, distributed task queues, etc. in Python. The process for sending messages was realized via calling the function of sending a message in smart contract. The receiving message function was realized via monitoring the Event log of smart contract executing on the blockchain virtual machine (Ethereum). To send the training message, the sending message event was triggered and the application initiator then waited for the valid encrypted models from the verification contributor to fuse, as described above.

Figure 14:
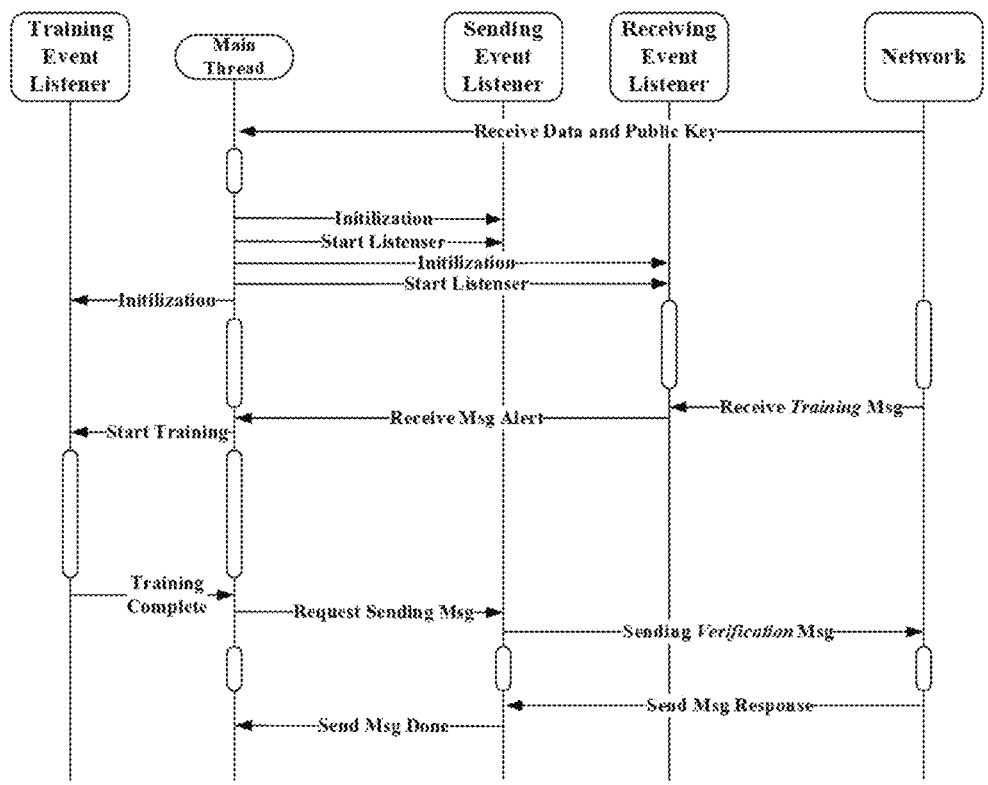
FIG. 14 is a schematic diagram showing workflow of a computing contributor computing node according to one or more embodiments of the present invention.

As set forth above, each computing contributor is designed to passively receive training requests from the application initiator and then process the training task by using its own or a provided dataset and public keys for model encryption. In these experiments, the training process was carried by the module tensorflow. Once the models were completed, these computing contributors shared the trained and encrypted models via the IPFS storage system. The hash values associated with these models were then sent to verification contributors via a verification message. FIG. 14 shows the work diagram of the computing contributor used for these experiments. The "Training Event Listener" in FIG. 14 configures the operation of computing contributors. The training process of the computing contributors in these experiments is shown in FIG. 2, and described above.

Figure 15:
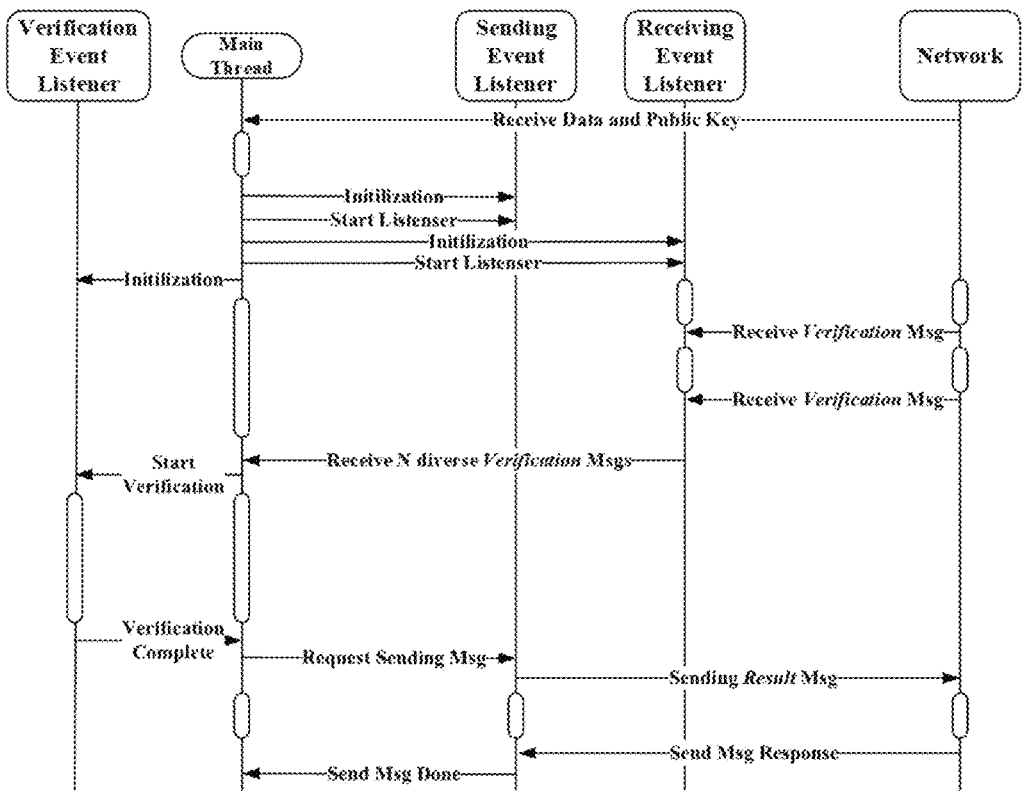
FIG. 15 is a schematic diagram showing workflow of a verification contributor computing node according to one or more embodiments of the present invention.

The verification process was executed in much the same way as the computing contributor described above. FIG. 15 shows the work diagram of a verification contributor. The term "Verification Event Listener" in FIG. 15 was configures the operation of verification contributors. Once the encrypted models had been verified according to the terms of the smart contract, the verification contributors sent the names of valid encrypted models to application initiator, as described above. FIG. 4 illustrates the verification process that was used for these experiments.

Privacy and Security Plug-in: In the embodiments tested, encryption was implemented after finishing the training process and before uploading to IPFS.

II. Results

This section summarizes some experimental results through 2 scenarios. In these scenarios we demonstrated the functionalities considering computing contributors with fully connected neural networks and convolutional neural network (CNN) learning models. However, our method can be extended to facilitate any type of neural network-based machine learning model, as set forth above.

A. Scenario I

This scenario demonstrates the operation of the system without the functionality of the encryption interface. In this scenario we use MNIST handwritten numbers dataset. We consider the participation of 5 computing contributors in a crowdsourced AI computing task. For this task, each computing contributors develop their own learning models, by using 500 local training data, 200 local testing data and 500 verification data. The initiator provides a set of data to the verification contributors for the verification task. The distribution of data among computing and verification contributors is summarized in Table II, below.

TABLE II

Summary of Data Distribution Among the Contributors

| Contributor | Set of Labels | No. Training Data | No. Testing Data | No. Verification Data |
|---|---|---|---|---|
| Verifiers | {0, 1, 2, 3, 4, 5, 6, 7, 8, 9} | 2000 | 500 | 1000 |
| Computing Contributor 1 | {0, 1, 2, 3, 4} | 500 | 200 | 500 |
| Computing Contributor 2 | {0, 1, 2, 8, 9} | 500 | 200 | 500 |
| Computing Contributor 3 | {0, 6, 7, 8, 9} | 500 | 200 | 500 |
| Computing Contributor 4 | {0, 1, 5, 7, 8, 9} | 500 | 200 | 500 |
| Computing Contributor 5 | {5, 6, 7, 8, 9} | 500 | 200 | 500 |

In this scenario, each computing contributor design and train its own CNN for this decentralized and cooperative learning task. Table III summarizes the structures of the CNN models and the training parameters used by the individual computing contributors. CNN models are designed using TensorFlow, an open source machine learning library developed by Google, and graphs were designed using python TensorFlow APIs. (See, M. Abadi, P. Barham, J. Chen, Z. Chen, A. Davis, J. Dean, M. Devin, S. Ghemawat, G. Irving, M. Isard et al., "Tensorflow: A system for large-scale machine learning." in *OSDI*, vol. 16, 2016, pp. 265-283, the disclosure of which is incorporated herein by reference in its entirety.) The invented infrastructure is not dependent on machine learning architectures. The suitability of the infrastructure of various embodiments of the present invention for other architectures besides TensorFlow has been verified. After sufficiently training the models the graphs of trained models are serialized and saved to files using TensorFlow Saver APIs. Save operation creates 3 files: (1) a file with .meta extension that saves the complete TensorFlow graph information including all variables, operations, collections etc.; (2) a file with .data extension that contains all the saved values of the weights, biases, gradients and all the other variables; and (3) a index file which maps the connections between the contents of the .meta and .data files. The serialized graph files are required to be shared with the verification contributor. To achieve this in a decentralized manner, a distributed file system that facilitates peer-to-peer sharing of data was required. The tested implementation utilizes the IPFS content-addressable distributed file system protocol.

TABLE III

Parameters of the CNN Models used by Computing Contributors
CNN Parameters

| | Computing Contributor 1 | Computing Contributor 1 | Computing Contributor 1 | Computing Contributor 1 | Computing Contributor 1 |
|---|---|---|---|---|---|
| Inputs | 28 × 28 images | | | | |
| Convolution layer 1 | 32 5 × 5 kernels | 64 5 × 5 kernels | 32 5 × 5 kernels | 16 10 × 10 kernels | 16 10 × 10 kernels |
| Pooling layer 1 | 2 × 2 maximum pooling | 2 × 2 maximum pooling | 2 × 2 maximum pooling | 2 × 2 maximum pooling | 2 × 2 maximum pooling |
| Convolution layer 2 | 16 5 × 5× 32 kernels | 32 5 × 5 × 64 kernels | 32 10 × 10 × 32 kernels | 16 10 × 10 × 16 kernels | 16 5 × 5 × 16 kernels |
| Pooling layer 2 | 2 × 2 maximum pooling | 2 × 2 maximum pooling | 2 × 2 maximum pooling | 2 × 2 maximum pooling | 2 × 2 maximum pooling |
| Convolution layer 3 | 8 2 × 2 × 16 kernels | 16 2 × 2 × 32 kernels | 16 4 × 4 × 32 kernels | 12 5 × 5 × 16 kernels | 8 5 × 5 × 16 kernels |
| Reshaped vector (Convolution layer 3 outputs are flatten as a vector of size) | 7 × 7 × 8 = 392 | 7 × 7 × 16 = 784 | 7 × 7 × 16 = 784 | 7 × 7 × 12 = 588 | 7 × 7 × 8 = 392 |
| hidden layer | Fully connected hidden layer with size 500 | | | | |
| Output | 10 outputs with softmax activation | | | | |
| Training method | Adam Optimization Algorithm (Python) | | | | |
| Learning rate | 0.0001 | | | | |
| Maximum number of iterations | 100000 | | | | |

Figure 16A:
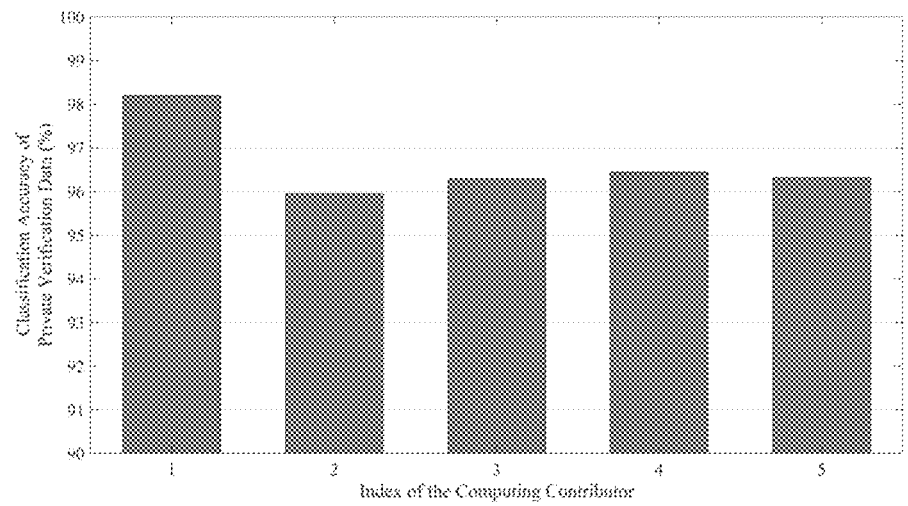
FIGS. 16A-B are graphs showing verification accuracy obtained by each computing contributor by using their local verification data (FIG. 16A) and comparing the average evaluation accuracy reported by the verification contributor by using Strategies I and II versus the indices of the computing contributors of the fused models (FIG. 16B).
Figure 16B:
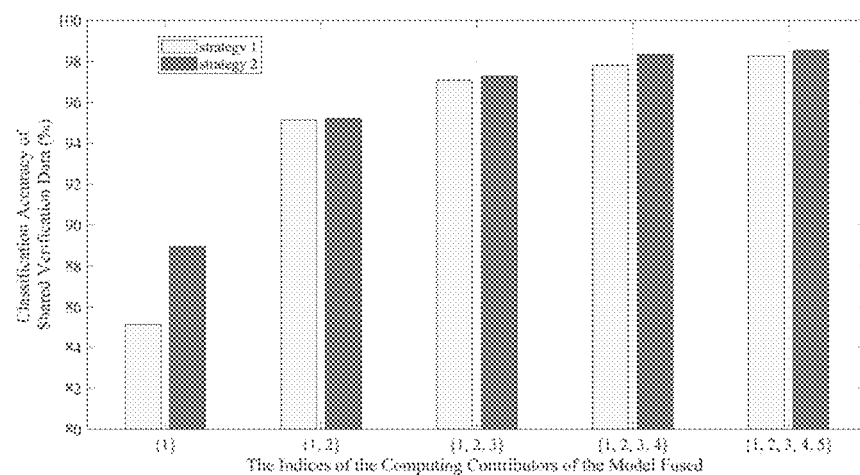

For this task, the accuracy of the CNN models developed by the individual computing contributors for classifying their local verification data after 1000 iterations of training is shown in FIG. 16A. As shown in the FIG. 16A, all the data providers achieve above the predefined threshold 95% accuracy after training for a fixed number of iterations. Therefore, all models are shared with the model verifiers. The evaluation results, obtained by a verification contributor using Model Fusion Strategies I and II, respectively, are shown in FIG. 16B. When a verification contributor receives a new computing model, it fuses the model with currently available models. As can be seen in FIG. 16B, the accuracy of the verification data increased as the number of fused models increased for both strategies, and thus, all the models are considered to have contributions to the given task, by using both strategies. FIG. 16B also shows that the fused model accuracy achieved by using Strategy II is marginally better than that obtained by using Strategy I.

B. Scenario II

In this scenario, the operation of the system with the functionality of the encryption interface was demonstrated. The simulated decentralized learning task here was detecting a fading channel by using link power data. The data used in this task was from Link Power database provided by NASA. In the simulation, randomized data was divided into 4 parts, each part containing 10000 items of training data and a corresponding 1000 items of testing data. The divided data was assigned to 3 computing contributors and one verification contributor in the testbed. The computing contributors used 2-layer fully connected neural network models for binary classification tasks. In order to demonstrate the correct operation with encryption, the Table IV summarizes the accuracies obtained with and without encryption on each computing contributor with their private testing data and privately trained model. Detection accuracies of fused models on verifier using the Fusion Strategy II are shown in Table V. Hidden layer of each 2-layer neural network is considered as the shared feature of the model. Accuracy for encrypted features was achieved after training for 10 times more iterations than the decrypted feature case. Therefore, although it is suitable to compare the plaintext models using cipherspace model features, they were not as good as the original plaintext features.

TABLE IV

Fading Channel Detection Accuracy of Fully Connected Neural Networks on Private Data

|  | Detection Accuracy (%) | |
| --- | --- | --- |
| Model | Without Encryption | With Encryption |
| Computing Contributor 1 | 92.5 | 92.5 |
| Computing Contributor 2 | 93.2 | 93.1 |
| Computing Contributor 3 | 94 | 94 |

TABLE V

Fused Model Accuracies of a Verifier with Fully Connected Neural Networks

|  | Detection Accuracy (%) | |
| --- | --- | --- |
| Model | With Decrypted Features | With Encrypted Features |
| Computing Contributor 1 and 2 | 94.5 | 94 |
| Computing Contributor 1, 2, and 3 | 96 | 94.5 |

Similarly, the use of encryption interface functionality on CNN models with ReLU activation and 2 convolution layers was also demonstrated for the same fading channel detection task. See, Tables VI and VII.

TABLE VI

Fading Channel Detection Accuracy of CNNs on Private Data

|  | Detection Accuracy (%) | |
| --- | --- | --- |
| Model | Without Encryption | With Encryption |
| Computing Contributor 1 | 93 | 91.6 |
| Computing Contributor 2 | 93.1 | 92.4 |
| Computing Contributor 3 | 93.2 | 92.3 |

TABLE VII

Fused Model Accuracies of a Verifier with CNNs

| Model | Detection Accuracy (%) (With Encrypted Features) |
| --- | --- |
| Computing Contributor 1 and 2 | 94.5 |
| Computing Contributor 1, 2, and 3 | 95 |

Tables IX summarizes the timing result obtained for execution and encryption of the CNN ML models with ReLU activations. The results are obtained on a Corei5 CPU for 1000 testing data. ML models are executed partially on TensorFlow graphs and partially on native Python (calculations of activation functions are on native Python). Encryptions and decryptions are performed using native Python with Numpy. It can be seen that with ReLU execution times is only two times higher since ReLU function has no modification in our cipherspace.

TABLE IX

Timing Results for CNN with ReLU Activation

|  | Execution Time | | |
| --- | --- | --- | --- |
| Learning Model with ReLU | Overhead for Encryption (ms) | Execution without Encryption (ms) | Execution with Encryption (ms) |
| Computing Contributor 1 | 7.7 | 60 | 126 |
| Computing Contributor 2 | 7.6 | 57 | 123 |
| Computing Contributor 3 | 7.7 | 59 | 125 |

In light of the foregoing, it should be appreciated that the present invention significantly advances the art by providing a decentralized and secure computing system for developing machine learning models that is structurally and functionally improved in a number of ways. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

What is claimed is:

1. A method for developing machine learning models through a decentralized and secure computing system, the method comprising the steps of:
    establishing a peer to peer (P2P) network running on a blockchain platform and including a plurality of nodes capable of acting as any one of an application initiator node, a computing contributor node, and a verification contributor node;

wherein the application initiator node:
defines a task for generating a machine learning model, the task being defined through a blockchain smart contract, and
broadcasts the task to the P2P network via the blockchain smart contract such that the plurality of nodes receive the task and assist in the task as either computing contributor nodes or verification contributor nodes;

wherein each computing contributor node:
employs contributor-available data to generate a private model for achieving the task,
encrypts the private model, and
provides the encrypted private model for access by verification contributor nodes;

wherein each verification contributor node:
accesses the encrypted private model,
tests the private model to determine if it achieves the task, and
informs the application initiator node if a private model satisfies the task.

2. The method of claim 1, further comprising decentralized storage for access by application initiator nodes, computing contributor nodes, and verification contributor nodes.

3. The method of claim 2, wherein the application initiator node provides data or an initial machine learning model or both data and an initial machine learning model to decentralized storage for access by computing contributor nodes or verification contributor nodes or both computing contributor nodes and verification contributor nodes.

4. The method of claim 1, wherein the private model is encrypted using homomorphic encryption.

5. The method of claim 1, wherein the private model is encrypted using homomorphic encryption.

6. The method of claim 1, wherein a public key and a secret key are generated by the application initiator, wherein said public key permits encryption of testing documents in the same manner as the private model so that the private model may be tested in cipherspace.

7. The method of claim 6 wherein said secret key may be used to decrypt the private model.

8. A method for developing machine learning models through a decentralized and secure computing system, the method comprising the steps of:
establishing a peer to peer (P2P) network running on a blockchain platform and including a plurality of nodes capable of acting as any one of an application initiator node, a computing contributor node, and a verification contributor node; and a decentralized storage accessible by said plurality of nodes;

wherein one of said plurality of nodes elects to act as an application initiator node, prepares a blockchain smart contract on said blockchain platform, said blockchain smart contract defining a task for generating a machine learning model, a criteria for selecting one or more nodes of said a plurality of nodes to act as a verification contributor node, a criteria for verifying completion of the task, and a criteria for triggering a transfer event, said task being broadcast the to the P2P network via the blockchain smart contract such that the plurality of nodes receive the task;

wherein said application initiator node generates a public key available to all of the nodes on said P2P network and a secret key available only to said application initiator node;

wherein each node receiving the tasks elects whether to assist with the task by acting as a computing contributor node, with the proviso that at least one of said plurality of nodes elects to act as a computing contributor node;

wherein each of said plurality of nodes acting as a computing contributor node employs contributor-available data to generate a private model for achieving the task, and stores an encrypted private model on the decentralized storage;

wherein one or more of said plurality of nodes is selected to act a verification contributor node according to the criteria for selecting one or more nodes of said a plurality of nodes to act as a verification contributor node set forth in the blockchain smart contract;

wherein each verification contributor node accesses the encrypted private model, tests the private model according to the criteria for verifying completion of the task set forth in the blockchain smart contract to determine if it achieves the task, and informs the blockchain smart contract on said blockchain platform if the private model satisfies the task;

wherein said blockchain smart contract on said blockchain platform determines whether the criteria for triggering a transfer event have been met, and if they have been met then allows said application initiator node to access and decrypt said private model.

9. The method of claim 8, wherein the private model is encrypted using homomorphic encryption.

10. The method of claim 8, wherein said public key permits encryption of testing documents in the same manner as the private model so that the private model may be tested in cipherspace.

11. The method of claim 8 wherein said secret key may be used to decrypt the private model.

* * * * *